(12) United States Patent
Bei et al.

(10) Patent No.: US 10,953,998 B2
(45) Date of Patent: Mar. 23, 2021

(54) SYSTEMS AND METHODS FOR PROVIDING STABILITY SUPPORT

(71) Applicant: SZ DJI TECHNOLOGY CO., LTD., Shenzhen (CN)

(72) Inventors: Shimeng Bei, Shenzhen (CN); Zhenkai Wu, Shenzhen (CN); Zhilong Zhu, Shenzhen (CN); Yuqi Bao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/248,386

(22) Filed: Jan. 15, 2019

(65) Prior Publication Data

US 2019/0185182 A1   Jun. 20, 2019

Related U.S. Application Data

(63) Continuation of application No. PCT/CN2017/091713, filed on Jul. 4, 2017.

(30) Foreign Application Priority Data

Jul. 15, 2016   (WO) ................ PCT/CN2016/090219

(51) Int. Cl.
*F16M 11/00*   (2006.01)
*B64D 47/08*   (2006.01)
(Continued)

(52) U.S. Cl.
CPC .............. *B64D 47/08* (2013.01); *B64G 1/16* (2013.01); *F16M 11/10* (2013.01);
(Continued)

(58) Field of Classification Search
CPC . F16M 11/18; F16M 11/2014; F16M 11/2007
(Continued)

(56) References Cited

U.S. PATENT DOCUMENTS 7,513,479 B2 *   4/2009   Li ....................... E04H 12/2238
                                                                248/519
9,511,786 B1 *  12/2016   Hickcox .................. B62B 3/02
                   (Continued)

FOREIGN PATENT DOCUMENTS

CN           1718510 A       1/2006
CN         200960951 Y      10/2007
                  (Continued)

OTHER PUBLICATIONS

The World Intellectual Property Organization (WIPO) International Search Report and Written Opinion for PCT/CN2017/091713 dated Oct. 19, 2017 11 Pages.

(Continued)

*Primary Examiner* — Steven M Marsh
(74) *Attorney, Agent, or Firm* — Anova Law Group, PLLC

(57) ABSTRACT

Systems and methods are provided for providing stability support. The system may include a movable foundation that moves on a surface, and a base rotatably mounted to the movable foundation. A leveling platform may be adjustably mounted to the base and can pivot around a pivoting axis intersecting the base. A control arm connects the leveling platform and the base, and can effect the pivoting of the leveling platform by adjusting the length of the control arm. An alternative system may include a supporting scaffold that is adjustably connected to a movable foundation by at least three control arms. The at least three control arms can change length such that an angle of the supporting scaffold from the movable foundation changes.

11 Claims, 26 Drawing Sheets

(51) Int. Cl.
*F16M 11/18* (2006.01)
*F16M 11/42* (2006.01)
*G03B 17/56* (2021.01)
*F16M 11/10* (2006.01)
*B64G 1/16* (2006.01)
*F16M 11/20* (2006.01)
*F16M 11/28* (2006.01)
*F16M 11/12* (2006.01)
*G03B 15/00* (2021.01)
*H04N 5/225* (2006.01)
*B64C 39/02* (2006.01)

(52) U.S. Cl.
CPC .......... *F16M 11/123* (2013.01); *F16M 11/18* (2013.01); *F16M 11/2014* (2013.01); *F16M 11/2042* (2013.01); *F16M 11/2071* (2013.01); *F16M 11/2085* (2013.01); *F16M 11/28* (2013.01); *F16M 11/42* (2013.01); *G03B 15/006* (2013.01); *G03B 17/561* (2013.01); *B64C 39/024* (2013.01); *B64C 2201/027* (2013.01); *F16M 2200/041* (2013.01); *F16M 2200/044* (2013.01); *H04N 5/2251* (2013.01)

(58) Field of Classification Search
USPC ............ 248/125.7, 125.8, 125.9, 129, 187.1, 248/346.05
See application file for complete search history.

(56) References Cited

U.S. PATENT DOCUMENTS

| | | | |
|---|---|---|---|
| 10,624,455 B2 * | 4/2020 | Schiraga | A47C 4/50 |
| 2003/0201619 A1 | 10/2003 | Teng et al. | |
| 2004/0195789 A1 * | 10/2004 | Christensen | F16M 11/245 |
| | | | 280/35 |
| 2011/0077800 A1 | 3/2011 | Palmer et al. | |
| 2011/0113593 A1 | 5/2011 | Bebbington | |
| 2012/0026467 A1 | 2/2012 | Chapman | |
| 2013/0154213 A1 * | 6/2013 | Marquez-Molina | A45C 3/00 |
| | | | 280/35 |

FOREIGN PATENT DOCUMENTS

| | | |
|---|---|---|
| CN | 101615743 A | 12/2009 |
| CN | 201592632 U | 9/2010 |
| CN | 102069678 A | 5/2011 |
| CN | 102346482 A | 2/2012 |
| CN | 102506899 A | 6/2012 |
| CN | 102692787 A | 9/2012 |
| CN | 103318423 A | 9/2013 |
| CN | 103340542 A | 10/2013 |
| CN | 103417229 A | 12/2013 |
| CN | 103496348 A | 1/2014 |
| CN | 203686508 U | 7/2014 |
| CN | 204099484 U | 1/2015 |
| CN | 204447301 U | 7/2015 |
| CN | 104981644 A | 10/2015 |
| CN | 105128973 A | 12/2015 |
| CN | 105207037 A | 12/2015 |
| CN | 105644643 A | 6/2016 |

OTHER PUBLICATIONS

The World Intellectual Property Organization (WIPO) International Search Report and Written Opinion for PCT/CN2016/090219 dated Apr. 17, 2017 6 Pages.

Hongyi Liu, et al., Robotics Technology Foundation, pp. 167-168, Beijing Metallurgical Industry Press, 2002.

Linli Guo, et al., Manned Lunar Base Project, pp. 458-459, China Aerospace Publishing House, 2013.

* cited by examiner

SYSTEMS AND METHODS FOR PROVIDING STABILITY SUPPORT

CROSS-REFERENCE TO RELATED APPLICATION

This application is a continuation of International Application No. PCT/CN2017/091713, filed on Jul. 4, 2017, which claims priority of International Application No. PCT/CN2016/090219, filed on Jul. 15, 2016. The entire content of the two applications are incorporated herein by reference.

BACKGROUND

Providing stability support for structures on a movable object is important during travelling of the movable object. For instance, when a vehicle is traveling on an uneven surface (e.g., on a slope or over a bump), the center of gravity may change and thus may cause side tipping. Structures with stability support may prevent the vehicle from side tipping during movement, and thus improve the stability of the vehicle. Camera shooting can also benefit from structures with stability support to achieve steady and smooth footage.

SUMMARY

Described are systems and methods useful for providing stability support. The system may be installed on a movable object or a device/foundation that can be coupled to a movable object. In an embodiment, the system includes a base rotatably mounted to a movable foundation. In some aspects, the movable foundation can move on a surface (e.g., the ground). A leveling platform is adjustably mounted to the base, and can pivot around a pivoting axis that is parallel to the base. A control arm connects the leveling platform and the base, and is adjustable in length to effect pivoting of the leveling platform.

In some embodiments, the system can be controlled to (a) rotate the base so as to substantially align a pivoting plane of the leveling platform with a direction of the movement of the movable foundation and (b) pivot the leveling platform with respect to the pivoting axis so as to substantially maintain a predetermined orientation.

In an alternative embodiment, the system for providing stability support includes a base, and a supporting scaffold that is adjustably connected to the base by at least three control arms. The at least three control arms are adjustable in length to change an angle between the supporting scaffold and the base.

In some embodiments, provided is a movable vehicle that includes a foundation and at least three wheel holders, each of which is rotatably mounted to the foundation. Each wheel holder is rotatable about a first axis. The movable vehicle also includes a wheel that is rotatably connected to each of the wheel holders. Each wheel is rotatable about a second axis that is different from the first axis. The movable vehicle further includes a first motor that effects rotation of each wheel holder, and a second motor that effects rotation of each of the wheels.

Also provided is a system for providing stability support, which comprises an apparatus that comprises a base rotatably mounted to a movable foundation, a leveling platform pivotably mounted to the base and pivotable with respect to a pivoting axis that is parallel with the base, and a control arm connecting the leveling platform and the base and adjustable in length to effect pivoting of the leveling platform. The system also comprises a processor and program code which, when executed by the processor, control the apparatus to (a) rotate the base so as to substantially align a pivoting plane of the leveling support with a direction of the movement of the movable foundation and (b) pivot the leveling platform with respect to the pivoting axis so as to substantially maintain a predetermined orientation.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
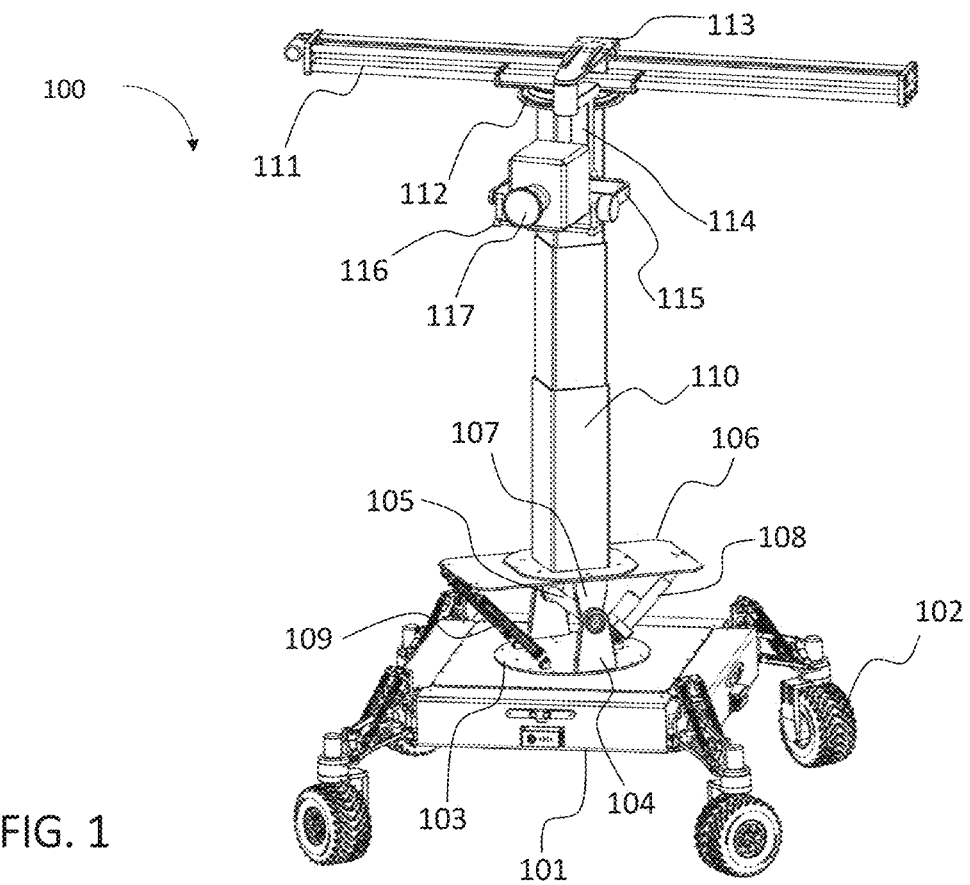
FIG. 1 illustrates a vehicle with a system for providing stability support.

Certain description as follows describes systems and methods useful for providing stability support. It will be apparent to those skilled in the art that such systems and methods can be used in any movable object or vehicle (e.g., an unmanned wheeled vehicle, an unmanned aircraft, or an unmanned watercraft) without limitation.

The present disclosure, in one embodiment, provides systems and methods for providing stability support for an apparatus mounted on a movable object, to prevent side tipping and improve the stability of the system. The apparatus may be mounted on a movable foundation that can travel on an uneven surface (or fly in the air or sail in the water). The movement (e.g., direction and speed) of the foundation can be controlled based on user input. The apparatus may include a leveling platform that is controlled by one or more control arms so that the relative angle of the leveling platform from the movable foundation is adjustable. The direction of the leveling platform may also be adjusted. Various structures and components can be mounted on the leveling platform.

In some instances, a camera is mounted on a camera rack that is connected to the leveling platform, and the shooting direction and angle can be adjusted based on user input. Sensors can be installed on the apparatus to detect and determine status of the apparatus (e.g., orientations, changes in position, speeds, or tilting angles). It will be apparent to those skilled in the art that when the movable foundation is tilted (e.g., when moving on a slope), the plane of the movable foundation is at an angle from the horizontal orientation. In some instances, the leveling platform is controlled to keep a substantially constant horizontal orientation. In another example, the leveling platform is controlled to keep the center of gravity of the apparatus approximately above the center of the movable foundation in the vertical orientation. The components of the apparatus may also be adjusted in response to the user input and the detection data by the sensors. In one embodiment, the system as disclosed herein can proactively adjust the center of gravity in response to the changes of tilting angle of the surface, and/or the direction and speed of the movement.

In some embodiments, the movable foundation can move in all directions on an uneven surface, and may include at least three wheels (e.g., four wheel as illustrated in the embodiments of the disclosure, or other numbers). The wheels are individually controlled to change orientation and speed based on user input. Each wheel may be controlled by a first motor (e.g., a rotation motor) to control the rotation of the wheel about a first axis and a second motor (e.g., a speed motor) to control the rotation of the wheel about a second axis. The first axis may be perpendicular to the second axis.

The term "user input" or "control signal input" as used herein, refers to information including, but not limited to, a user input on a remote controller or a GUI on a user device for controlling the operation of the system. For example, the user input or control signal input may include instructions for controlling the direction and speed of the movable foundation, the orientation/positions of the components of the apparatus, and/or the operation of the camera. In some instances, the movement of the foundation and the shooting of the camera are individually controlled. For example, the movement of the foundation is controlled based on user input from the remote controller, while the camera is controlled based on user input via the GUI on the user device (e.g., a mobile phone).

FIG. 1 illustrates an example of a system 100 for providing stability support. The system 100 can be used in combination with any suitable embodiment of the systems, devices, and methods disclosed herein. The system 100 includes a movable foundation 101 that is installed with a plurality of wheels 102. A base 103 is rotatably mounted to the top of the movable foundation 101, and can rotate about an axis that is perpendicular to the plane of the foundation 101. Two bottom arms 104 protrude from two sides of the base 103, and an axle 105 connects the top ends of the bottom arms 104. Two top arms 107 are rotatably mounted on the axel 105 and are attached to the bottom surface of a leveling platform 106. The leveling platform 106 can thus pivot about the axle 105. A control arm 108 connects the base 103 and one end of the leveling platform 106, while two supporting arms 109 connect the base 103 and the other end of the leveling platform 106. The length of the control arm 108 is adjustable. A supporting stand 110 protrudes from the top surface of the leveling platform 106, and supports a guide rail 111 that is rotatably connected via a rotation base 112 to the top of the supporting stand 110. A sliding arm 113 is movably mounted on the guide rail 111 and can slide along the guide rail 111. The sliding arm 113 includes a first arm 114 configured for yaw rotation, and a second arm 115 that is connected to the first arm 114 and configured for roll rotation. A camera rack 116 is connected to the second arm 115 and configured for pitch rotation. A camera 117 can be mounted on the camera rack 116 for shooting videos or photos. The adjustments and movements of the components in the system may be effected by motors or hydraulic power.

The movable foundation 101 can travel in any direction on an uneven surface. The movable foundation 101 may have a square shape or any other shapes. The wheels 102 are connected to corners of the foundation 101, and are configured to rotate for 360 degrees about an axis perpendicular to the plane of the foundation 101. Although four wheels are illustrated in FIG. 1, it is readily appreciated that other numbers (e.g., three, five, six, seven, eight, or nine) of wheels may be installed to facilitate the movement of the foundation 101. In some instances, the foundation 101 may be part of or connected to an unmanned aircraft (e.g., a drone) or an unmanned watercraft. In one embodiment, the movable foundation 101 houses at least one battery for powering the motors and electrical components of the system 100. A control terminal or control circuits may be installed inside or at any location on the foundation 101 for receiving user input and controlling the system 100 accordingly.

The base 103 may have a circular shape and is located on the top of the foundation 101. A motor can drive the rotation of the base 103 with respect to the foundation 101, about an axis that is perpendicular to the plane of the foundation 101. In some instances, the base 103 is fitted within a circular opening at the top of the foundation 101, and is driven by a motor installed inside the foundation 101. In another example, the base 103 may have other shapes and may be located above the top surface of the foundation 101. The two bottom arms 104 may be located adjacent to the perimeter of the base 103 facing each other. The bottom arms 104 and the axle 105 bear most of the weight of the leveling platform 106 and upper components, serving as a fulcrum.

The leveling platform 106 can pivot about the axle 105, while the relative angle of the leveling platform 106 from the base 103 can be changed. The pivoting of the leveling platform 106 may be controlled by the control arm 108, the length of which can be adjusted via a motor (e.g., a linear motor). Alternatively, the control arm is a telescopic cylinder and the length can be adjusted via oil hydraulics. The supporting arms 109 include suspension systems (e.g., coilover shocks or hydraulic dampers) that serve as shock absorbers. The supporting arms 109 may include other types of shock absorbers. The control arm 108 and the supporting arms 109 may be located on opposite sides with respect to the axle 105. The control arm 108 and the supporting arms 109 may be connected to the leveling platform 106 and the base 103 via hinge joints or other types of joint structures. Although one control arm 108 and two supporting arms 109 are illustrated in FIG. 1, the system 100 may include other numbers (e.g., two, three, four, five, six) of control arms and/or other numbers (e.g., one, three, four, five, six, seven, eight) of supporting arms.

In one example as shown in FIG. 1, the leveling platform 106 has a rectangular shape, and the axle 105 is perpendicular to the longitudinal axis of the leveling platform 106. The length of the leveling platform 106 may be greater than the diameter (or width) of the base 102. The supporting arms 109 and the control arm 108 are connected to opposite ends of the leveling platform 106 along the longitudinal axis. The two top arms 107 are affixed to the sides of the leveling platform 106 along the width, facing the base 103. Alternatively, the leveling platform 106 can have other shapes or sizes.

The supporting stand 110 protrudes from the top surface of the leveling platform 106, perpendicular to the plane of the leveling platform 106. The length of the supporting stand 110 may be adjustable. For example, the supporting stand 110 can include a plurality of parts in a telescopic structure, and one or more parts of the supporting stand 110 is retractable into other parts. The adjustment of the length of the supporting stand 110 may be effected by a motor or via hydraulic power.

The top of the supporting stand 110 is connected to the rotation base 112 which supports a guide rail 111. The guide rail 111 is rotatably about an axis that is parallel to the supporting stand 110. A rotation motor may control the rotation of the guide rail 111. The guide rail 111 can include a plurality of rails along the longitudinal axis. The sliding arm 113 includes a connector that is movably mounted on the rails of the guide rail 111, and can slide along the rails. The sliding and position of the sliding arm 113 may be controlled by a motor.

In some instances, the system 100 includes structures with a camera rack to carry a camera and control the shooting direction and angle. For example, the first arm 114 is connected to one side of the sliding arm 113 and extends toward the leveling platform 106. The first arm 114 is rotatable about the yaw axis (with respect to the camera 117). The second arm 115 is connected to the first arm 114 at the end away from the sliding arm 113, and is rotatable about the roll axis. The camera rack 116 is connected to the second arm 115, and is rotatable about the pitch axis. Thus, the camera 117, which is mounted on the camera rack 116, can have yaw, roll, and pitch movements during operation. When the foundation 101 travels on the uneven surface, the shooting direction and angle of the camera 117 can be adjusted via rotation of the base 103 and/or the rotation base 112, adjustment of the length of the control arm 108 and/or supporting stand 110, sliding of the sliding arm 113, and rotation of the first arm 114, second arm 115, and camera rack 116.

In some instances, during movement of the foundation 101, the base 103 can be rotated to keep the plane of the pivoting of the leveling platform 106 parallel to the direction of movement. The system 100 may include sensors for detecting the tilting angle of the foundation 101, the leveling platform 106, and/or the supporting stand 110. In some embodiment, the system 100 may include an inertial measurement unit (IMU) that includes accelerometers and gyroscopes for detecting changes in position, orientation, angles, and speeds of one or more components of the system 100. Based on the detection data about the status of the system 100, the length of the control arm 108 is adjusted to keep the leveling platform 106 at a substantially constant horizontal orientation. In another example, the leveling platform is controlled to keep the center of gravity of the apparatus approximately above the center of the movable foundation in the vertical orientation.

Figure 2:
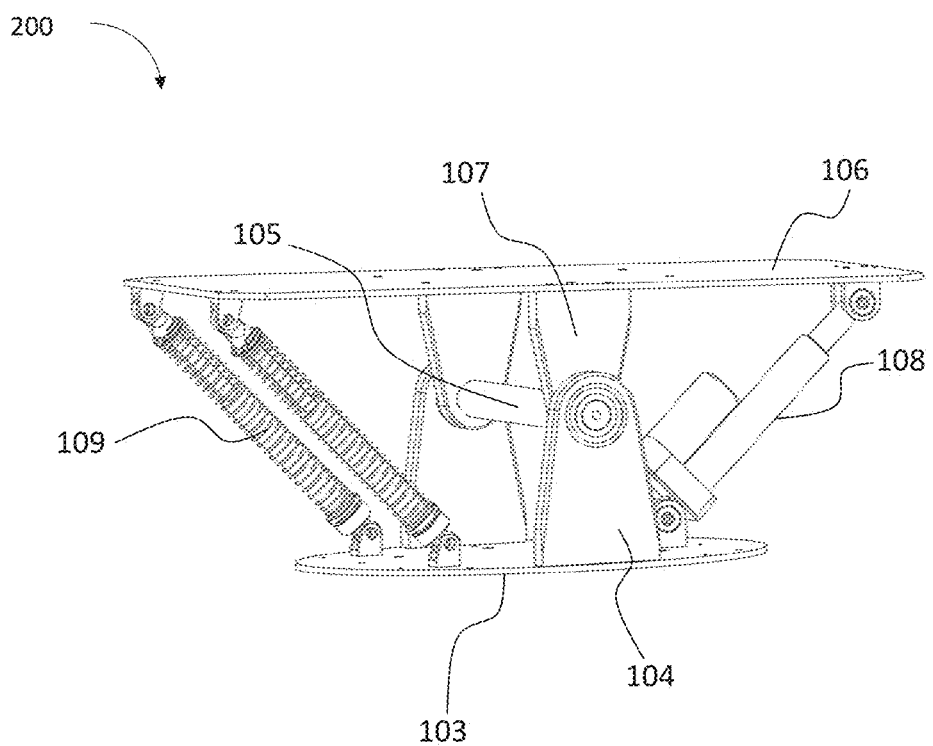
FIG. 2 illustrates a view of a portion of the system.

FIG. 2 shows a system 200, which can be part of the system 100, that provides stability support. The system 200 includes the base 103 that supports the leveling platform 106, which pivots about the axle 105. The control arm 108 and the supporting arms 109 connect the base 103 and the leveling platform 106. The length of the control arm 108 is adjustable to effect the pivoting of the leveling platform 106. The base 103 can be mounted on any movable foundation or device, and the control arm 108 can be adjusted to change the relative angle of the leveling platform 106 from the base 103. Any type of structures or devices may be mounted on top of the leveling platform 106.

Figure 3A:
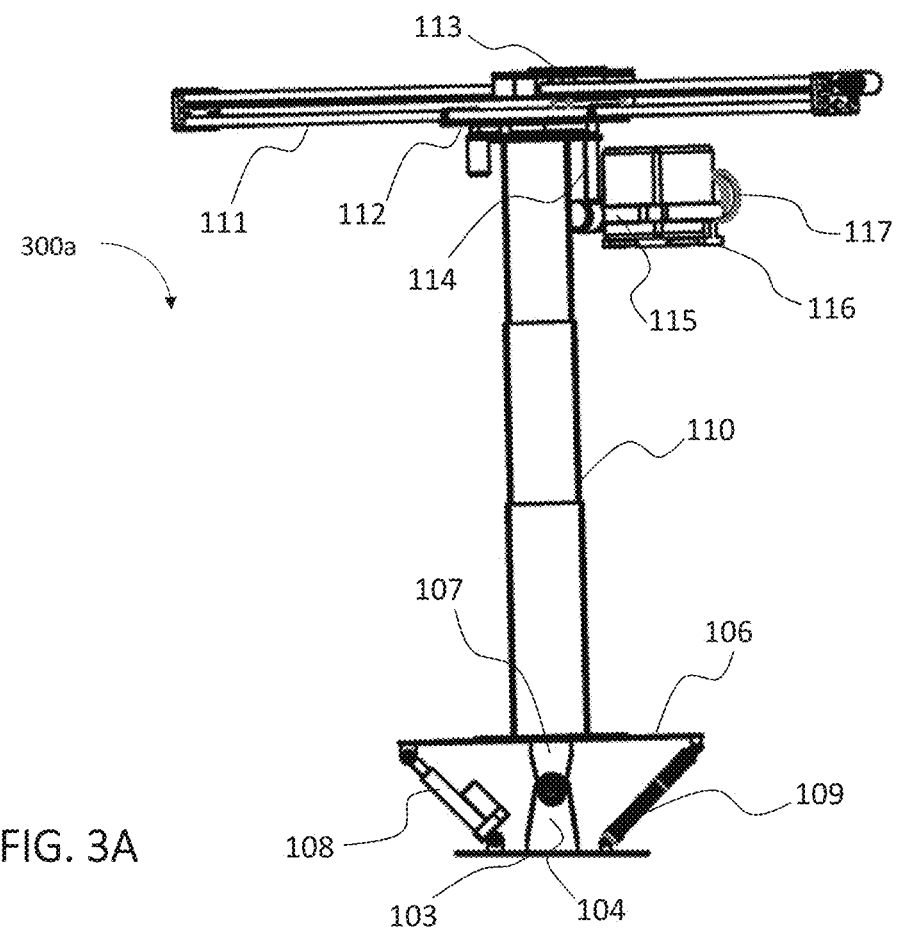
FIGS. 3A-C are different views of the system without the foundation and wheels.
Figure 3B:
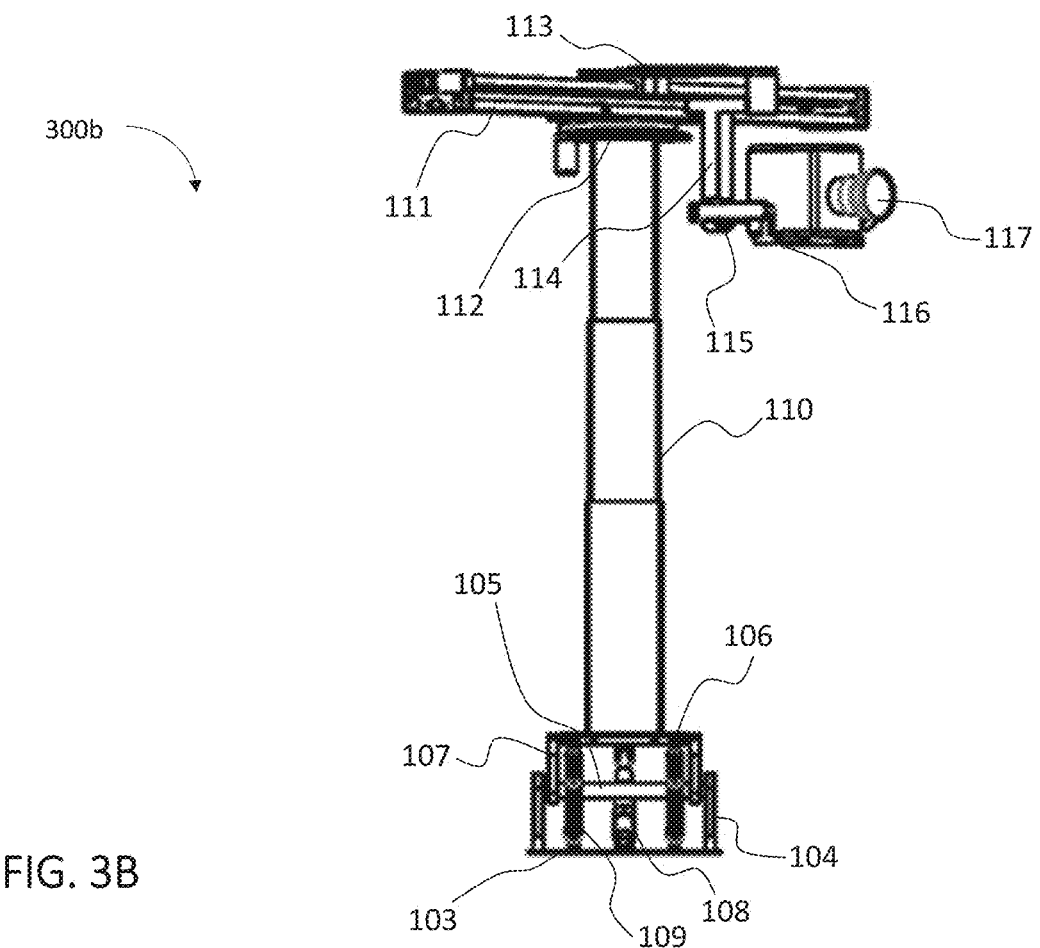
Figure 3C:
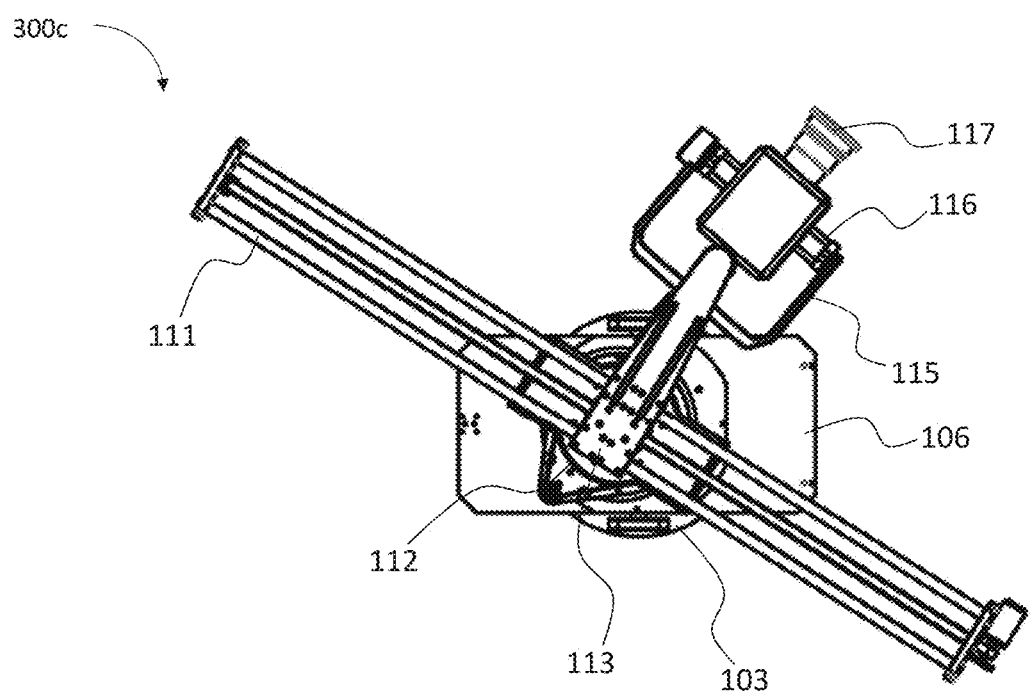

Different views of the system 100 without the foundation 101 and wheels 102 are demonstrated in FIGS. 3A-C. FIG. 3A shows a side view 300a of the system 100, with control arm 108 and supporting arms 109 on opposite side of the axis. FIG. 3B shows a front view 300b of the system 100, with both supporting arms 109 visible. FIG. 3C shows a top view 300c of the system 100, with the guide rail 111 positioned at an angle from the longitudinal axis of the leveling platform 106. The guide rail 111 may rotate for 360 degrees in a plane parallel to the leveling platform 106. In another embodiment, the guide rail 111 may rotate for more or less than 360 degrees in the plane.

Figure 4:
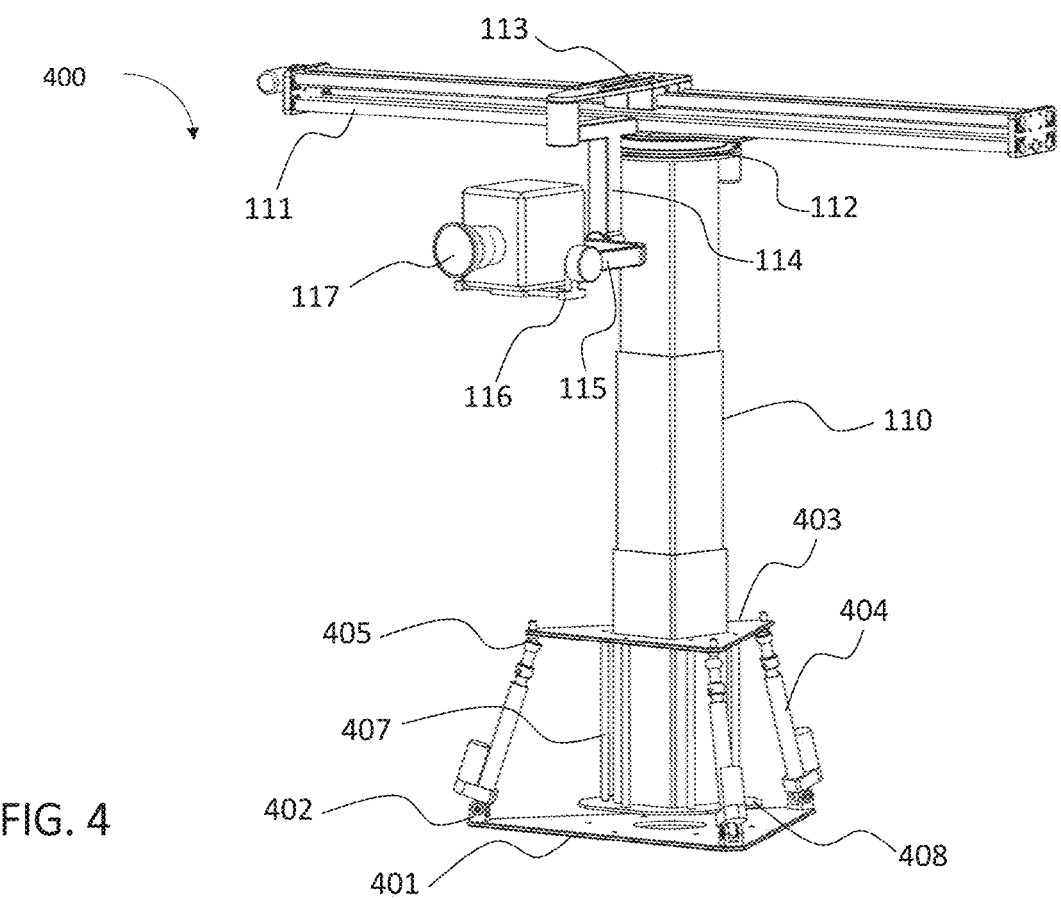
FIG. 4 illustrates an alternative system for providing stability support.

Another example of a system 400 for providing stability support is illustrated in FIG. 4. The system 400 includes a base 401 that may be mounted on any movable foundation or device. The system 400 also includes a leveling platform 403 that are connected to the base 401 via a plurality of control arms 404. The control arms 404 bear the weight of the leveling platform 403 and any upper components. The length of each control arm can be adjustable, so as to change the relative angle of the leveling platform 403 from the base 401. The control arms 404 may be controlled by motors (e.g., linear motors), or may be hydraulic cylinders drive by hydraulic power. In some embodiments, the length of the control arms can be adjusted, and the angles of the control arms from the leveling platform can also be adjusted. Although three control arms are illustrated in FIG. 4, the system 400 may include other numbers (e.g., four, five, six, seven, eight, nine) of control arms.

In one embodiment, the base 401 and the leveling platform 403 have triangular shapes. The three control arms 404 are connected to the three corners of the base 401 (via hinge joints 402) and to the leveling platform 403 (via ball and socket joints or spheroidal joints 405). Alternatively, any other type of joints can be used for connecting the control arms 404 to the base 401 and the leveling platform 403. The base 401 and the leveling platform 403 may have other shapes, and the control arms 404 may be connected to other locations of the base 401 and the leveling platform 403.

The leveling platform 403 has an opening in the center, through which the supporting stand 110 is inserted. In an embodiment, the supporting stand 110 is securely fitted in the opening to reduce or eliminate wobbling or lateral movement of the support stand 110 during the movement of the system 400. A plurality of rods 407 protrude from the bottom surface of the leveling platform 403, facing the base 401. The rods 407 are connected to a plate 408 that is located between, but not in contact with, the leveling platform 403 and the base 401. In some aspects, the rods 407 serve to connect and stabilize the plate 408 with respect to the leveling platform 403. In some aspects, the rods 407 and the plate 408 are rigidly connected to the leveling platform 403 and move along with the leveling platform 403 when the control arms are adjusted. In some aspects, the supporting stand 110 is held by the leveling platform 403 and the plate 408, while the bottom end of the supporting stand 110 rests on the plate 408. Thus, the supporting stand 110 is kept by the plate 408 and the leveling platform 403 to keep perpendicular to the plane of the leveling platform 403. Various components can be mounted on the supporting stand 110, as discussed above in FIG. 1. In an alternative embodiment, other structures are used to connect the supporting stand 110 to the leveling platform 403 so that the supporting stand 110 can move along with the leveling platform 403.

Figure 5A:
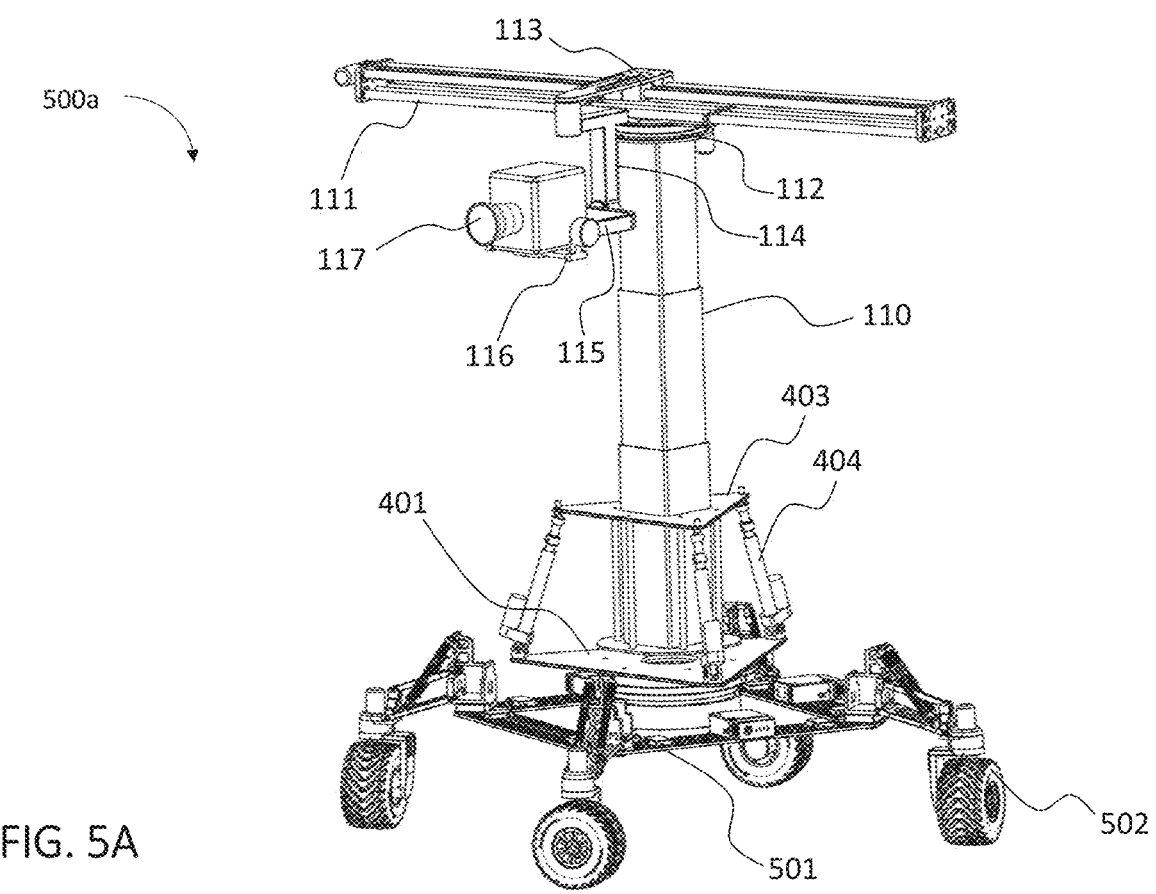
FIGS. 5A-B are different views of the system as shown in FIG. 4 mounted on a vehicle.
Figure 5B:
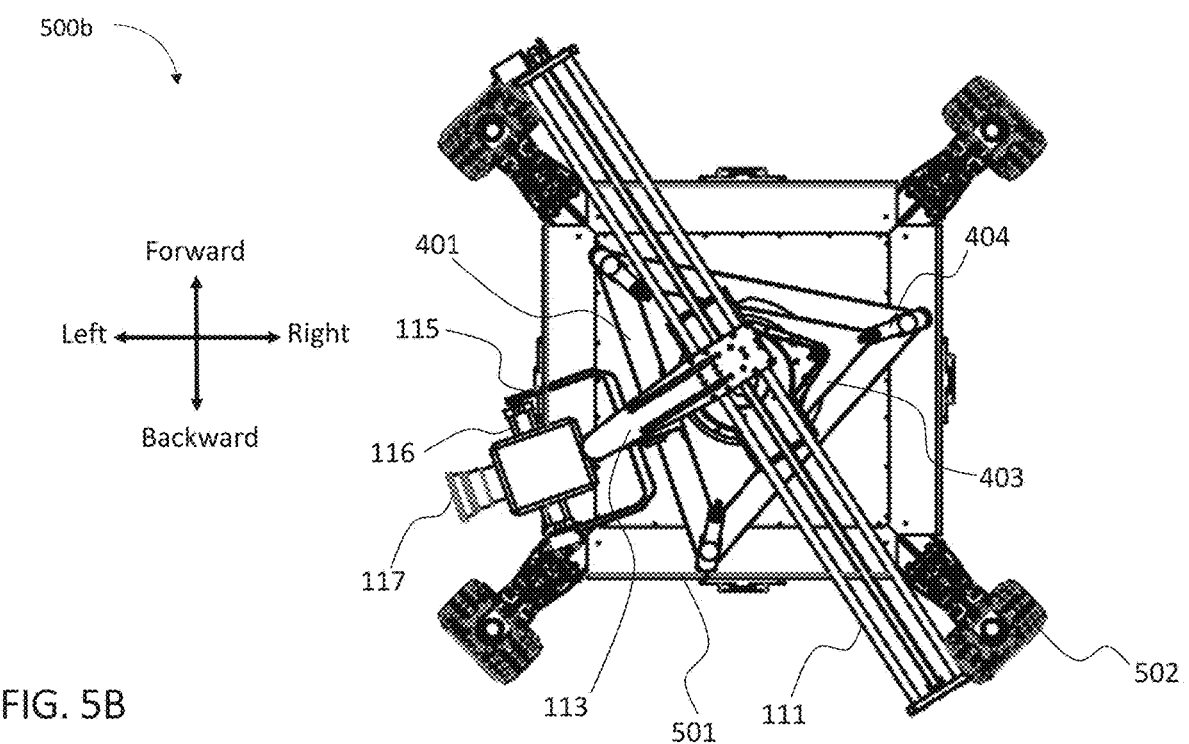

FIG. 5A shows a perspective view 500a of the system 400 that is mounted on a movable foundation 501. The foundation 501 and wheels 502 may be similar to the foundation 101 and wheels 102 of FIG. 1. The base 401 of the system 400 may be rotatably mounted on the foundation 501, and a motor is installed to drive the rotation of the base 401 with respect to the foundation 501 about an axis perpendicular to the plane of the foundation 501. In an embodiment, the base 401 includes a hole (as shown in FIG. 5A) that is configured to reduce weight of the base 401. In an embodiment, the base 401 may be a solid plate, or may include one or more openings to reduce overall weight of the base 401. In another embodiment, the base 401 is affixed to the top of the foundation 501 and is not rotatable with respect to the foundation 501. FIG. 5B shows a top view 500b of the system 400 mounted on the movable foundation 501.

In some embodiment, the directions of the movements of the movable foundation 501 are relative with respect to the movable foundation 501, and may be referred to as "forward", "backward", "left", and "right". For example, a direction to which one side of the movable foundation 501 faces can be referred to as the "forward" direction. An example of the relative directions are illustrated in FIG. 5B. It should be understood that in other embodiments, another direction with respect to the movable foundation can be referred to as "forward" direction.

Figure 6A:
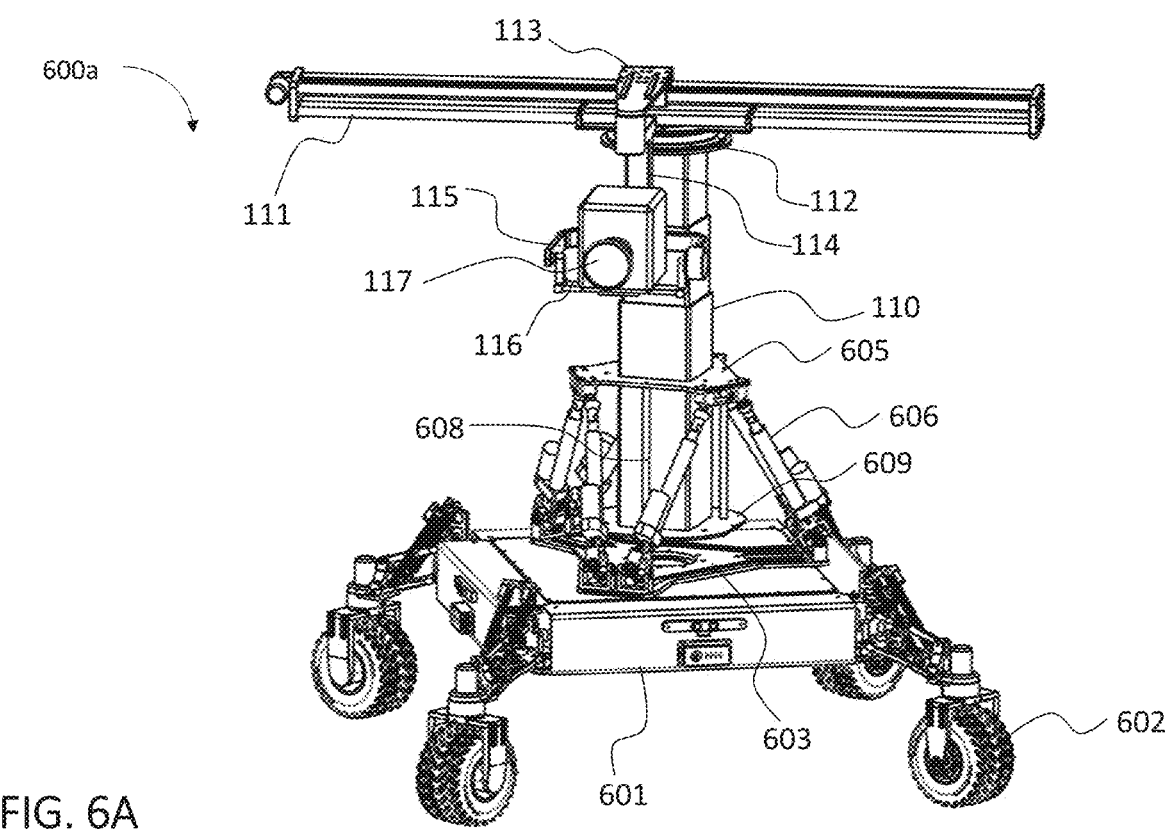
FIGS. 6A-B illustrate a vehicle with another system for providing stability support.

FIG. 6A illustrates an alternative embodiment of a system 600a that includes six control arms for supporting a leveling platform. The system 600a includes a foundation 601 and wheels 602 that may be similar to the foundation 101 and wheels 102 of FIG. 1. A base 603 can be rotatably mounted on the top of the foundation 601. Alternatively, the base 603 is fixed on the top of the foundation 601. In an embodiment, the base 603 has a proximately triangular shape with an extension arm extending radially from each corner of the base 603 on the same plane. In an alternative embodiment, the base 603 includes radially extending extension arms as part of the base 603. Two of the control arms 606 are connected to a distal end of each extension arm of the base 603 via hinge joints in a "V" configuration. In an embodiment, a distal end refers to the end that is farther away from the center of the base 603, and a proximal end refers to the end that is closer to the center of the base 603. A leveling platform 605 also has a proximately triangular shape, with two of the control arms 606 connected to each corner of the leveling platform 605 via hinge joints in an inverted-V configuration. It should be appreciated that other types of joints may be used (e.g., ball and socket joints or spheroidal joints). The two of the control arms 606 that are connected to the same extension arm of the base 603 are connected to two different corners of the leveling platform 605. The length of each control arm can be adjustable, so as to change the relative angle of the leveling platform 605 from the base 603. Each of the control arms 606 may be driven by a motor (e.g., a linear motor), or may be a hydraulic cylinder drive by hydraulic power. In an embodiment, each of the control arms 606 is driven by a dedicated motor. In another embodiment, each pair of the control arms 606 (e.g., in a V configuration) is driven by one motor. Alternatively, the system 600a may include other numbers of control arms. The base 603 and leveling platform 605 may have other shapes.

Figure 6B:
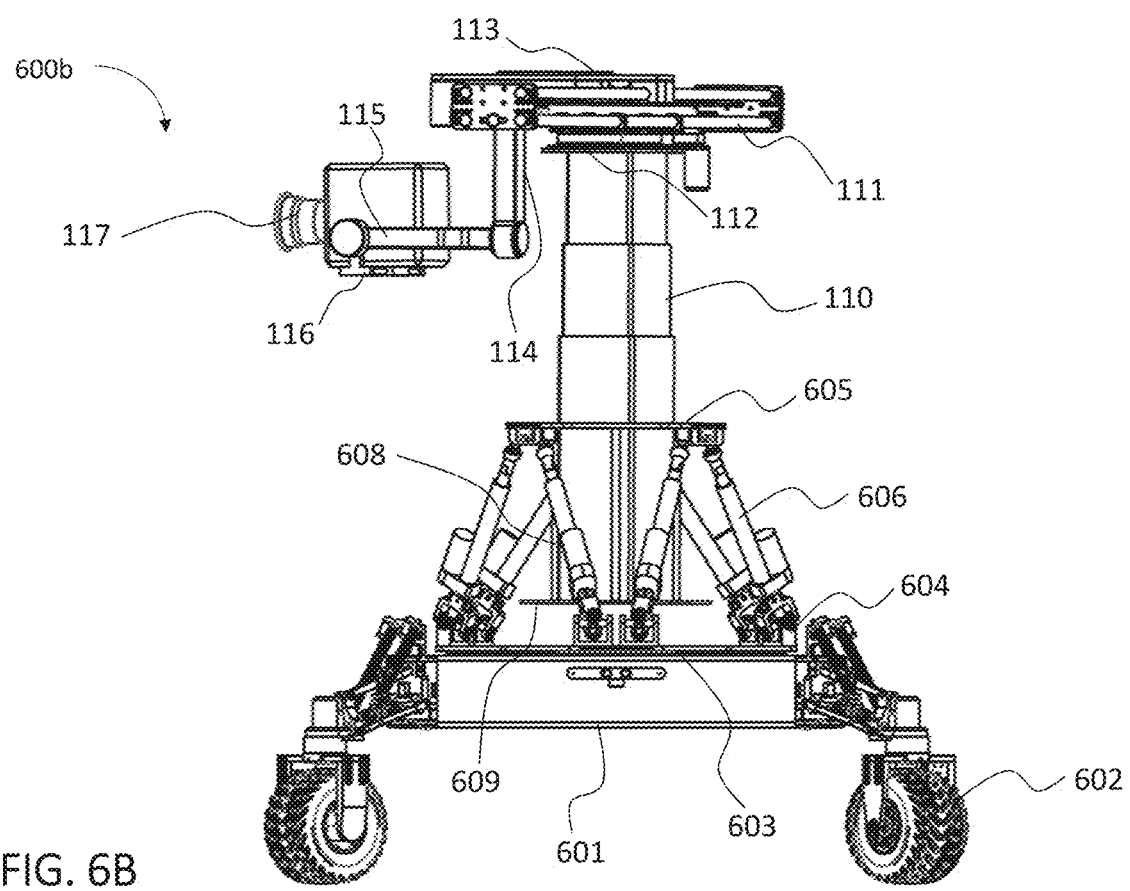

The leveling platform 605 can include an opening through which the supporting stand 110 is securely fitted. The system 600a can also include rods 608 and a plate 609, which are similar to the rods 407 and plate 408 of FIG. 4, for stabilizing and supporting the supporting stand 110. The control arms 606 are coordinately controlled to adjust the orientation of the leveling platform 605. FIG. 6B shows a side view 600b of the system 600a.

Figure 7:
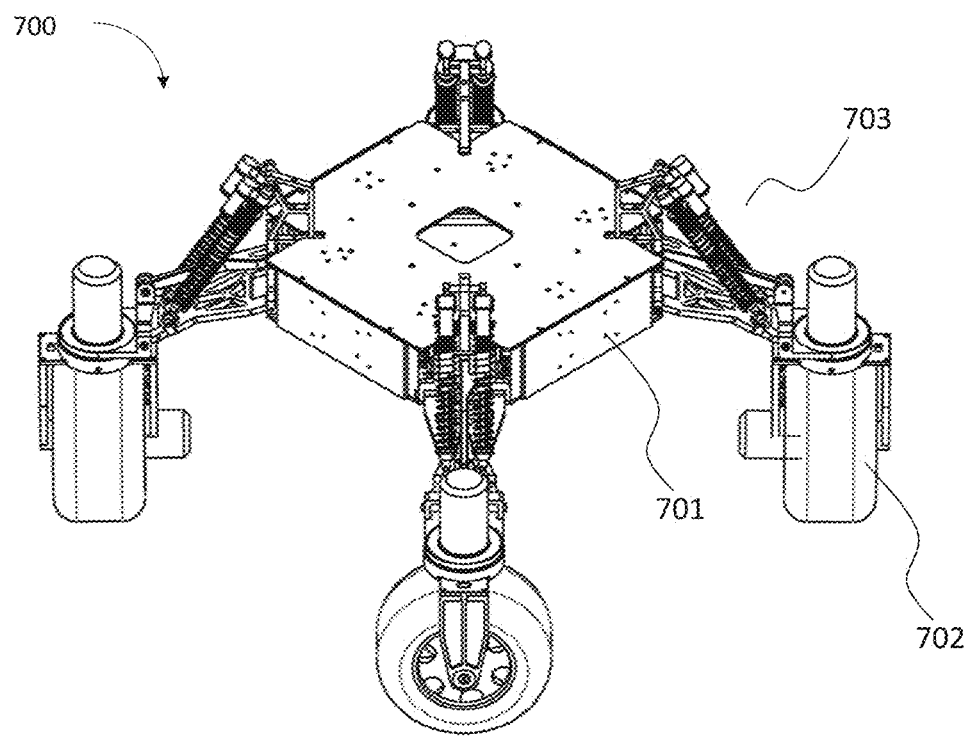
FIG. 7 illustrates a vehicle on which the system could be mounted.

FIG. 7 shows a perspective view of a vehicle 700 that includes a foundation 701 connected with four wheels 702 via connectors 703. The foundation 701 and wheels 702 may be embodiments of the foundations 101, 501, 601, and wheels 102, 502, 602, respectively. The vehicle 700 can be used in combination with any suitable embodiment of the systems, apparatuses, and methods disclosed herein. A control terminal or signal transmitter/receiver may be mounted on the foundation 701 for receiving control signal input. The vehicle 700 may be used alone or in combination with any system/apparatus mounted to the vehicle 700. In one aspect, the connectors 703 are detachable from the foundation 701. The wheels 702 are individually controlled and each includes two motors for controlling the orientation and speed, respectively. The details of the connectors 703 and the wheels 702 are described below in FIGS. 8A-9E.

Figure 8A:
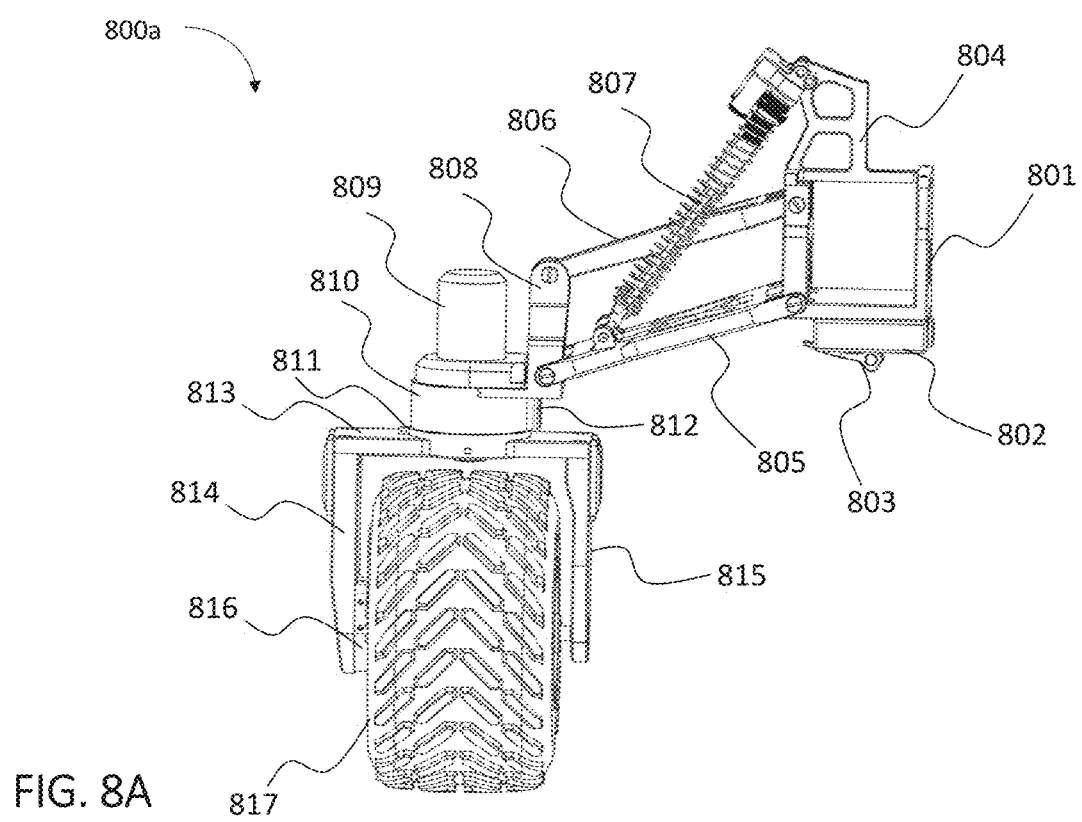
FIG. 8A illustrates a wheel with a wheel holder that can connect to the foundation.

An example of a wheel with a connector is shown in FIG. 8A. The connector includes a connector base 801 that can be locked in a receiving structure of the foundation 701 (e.g., at a corner or a side of the foundation 701). In one embodiment, the bottom of the connector base 801 is connected to an installation base 802 that includes a lever 803, which when pressed down toward the ground as shown in FIG. 8A, releases the installation base 802 and connector base 801 from the receiving structure of the foundation 701. alternatively, the connector base 801 may include other structures that allow the connector to be detachably connected to the foundation 701.

A suspension rack 804 may be installed on the top of the connector base 801. A bottom arm 805 and a top arm 806 connect the connector base 801 to a vertical arm 808. One or more suspension arms 807 are connected between the top of the suspension rack 804 and the bottom arm 805. The suspension arms 807 may include any type of shock absorbers such as, but not limited to, coil-over shocks and hydraulic dampers. Alternatively, a MacPherson strut may be used in the system for shock absorption. The vertical arm 808 is fixed to an outer wall of a collar 810, while a rotation motor 809 with a motor axle is inserted in and held by the collar 810. The bottom of the motor axle is connected to the top center of a wheel holder 813, and thus can drive the rotation of the wheel holder 813 with respect to the collar 810. The wheel holder 813 can rotate for 360 degrees about the axle of the rotation motor 809. In an embodiment, the wheel holder 813 can rotate for more or less than 360 degrees about the axle of the rotation motor 809. In one embodiment, the rotation motor 809 is connected, via electric wires, to a control terminal (not shown) mounted on the foundation 701 for receiving electric power supply and instruction signals.

A sensor 812 is installed on one side of the collar 810 for detecting the orientation of the wheel holder 813. A piece of magnet 811 is located on the wheel holder 813 adjacent to the perimeter of the collar 810. In one embodiment, the sensor 812 is a Hall effect sensor (or "Hall sensor"), which varies its output voltage in response to a magnetic field change when the magnet 811 gets close to the sensor 812 during rotation of the wheel holder 813. The Hall sensor 812 is not in contact with the magnet 811 or any part of the wheel holder 813. Other types of sensors may be used to detect the orientation of the wheel holder 813.

The wheel holder 813 includes a main arm 814 and an auxiliary arm 815 that are facing each other and parallel to the rotational axis of the wheel holder 813. A speed motor 816 is installed at an end of the main arm 814, and the axle of the speed motor 816 is supported by an end of the auxiliary arm 815. In one embodiment, the axle of the speed motor 816 is perpendicular to the axle of the rotation motor 809. A wheel 817, which is located between the main arm 814 and auxiliary arm 815, is mounted on the axle of the speed motor 816 to rotate about the axle of the speed motor 816. The wheel 817 may have a tire mounted on the outer edge of the wheel 817. The rotation motor 809 and the speed motor 816 may be individually controlled.

Figure 8B:
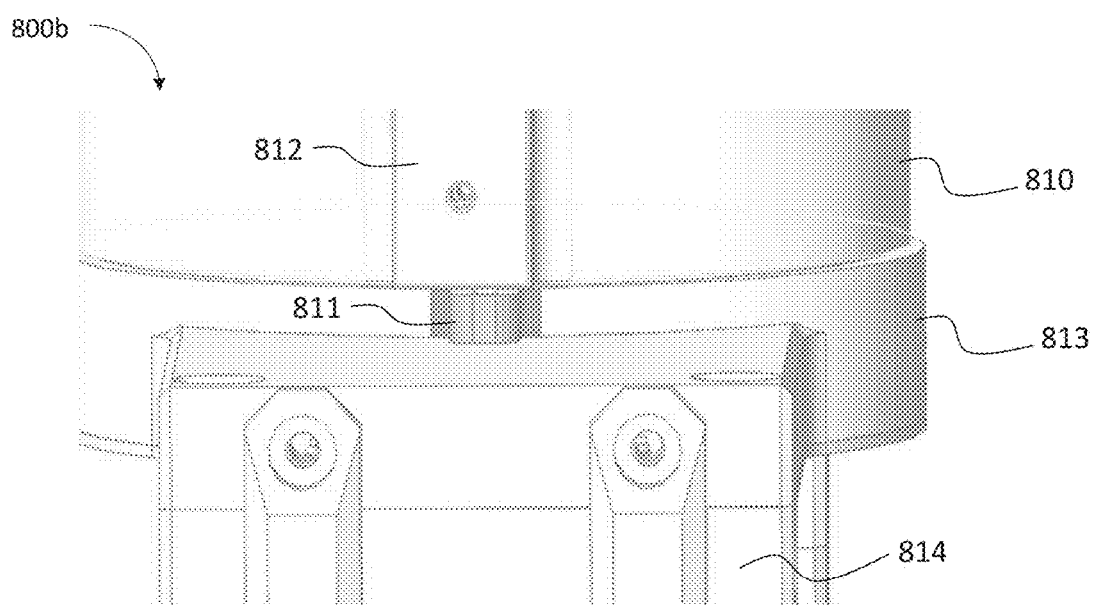
FIG. 8B illustrates a sensor that detects an orientation of the wheel.

When the vehicle is turned on, the orientation of the wheels may be unknown. Thus an initial orientation of each wheel needs to be determined so as to control the wheels to rotate to desired orientations. In an embodiment, when the vehicle is turned on, initial rotational movements of the wheels may be carried out for determining the orientation of the wheels. FIG. 8B shows that the sensor 812, which is installed on the collar 810, can detect the magnetic field change when the magnet 811 on the wheel holder 813 moves below the sensor 812. In this case, a circuit of the Hall sensor may output a signal to the control system or control terminal, indicating the current orientation of the wheel holder 813. Then the rotation motor 809 may control the wheel holder 813 to continue rotation until the desired orientation is adopted. Each sensor for detecting each wheel holder may operate individually, and thus the detection and adjustment of orientation for the wheels could be independently carried out. In an embodiment, the detection and adjustment of orientation for the wheels could be substantially concurrently carried out.

Figure 9A:
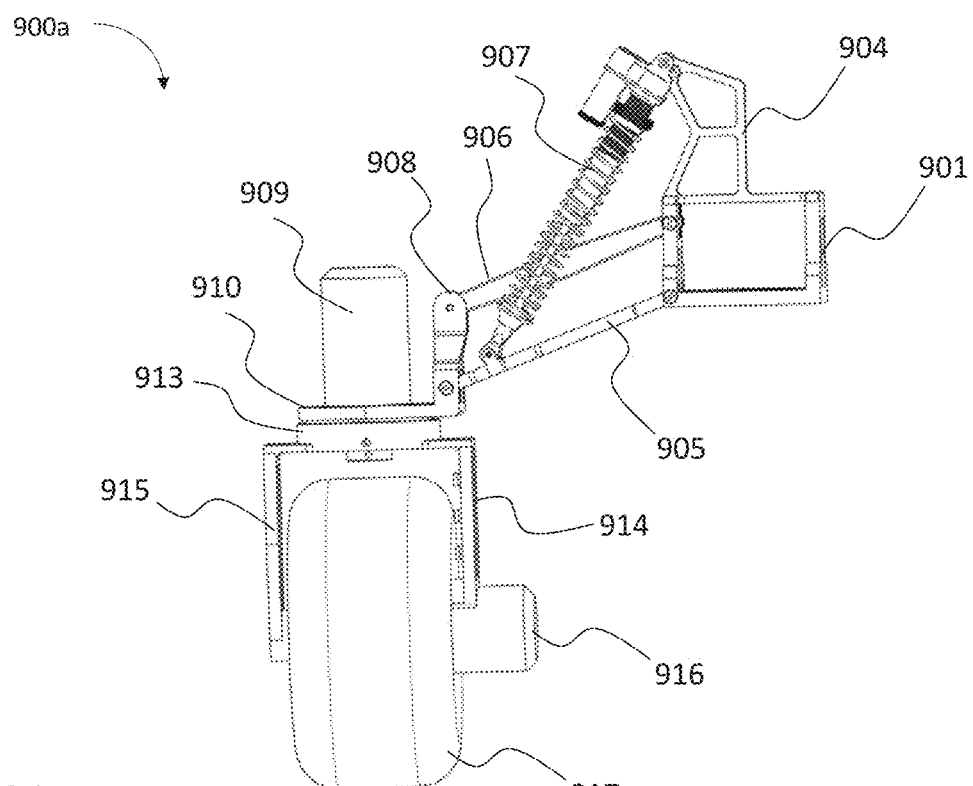
FIGS. 9A-E illustrate different views of an embodiment of the wheel and wheel holder.
Figure 9B:
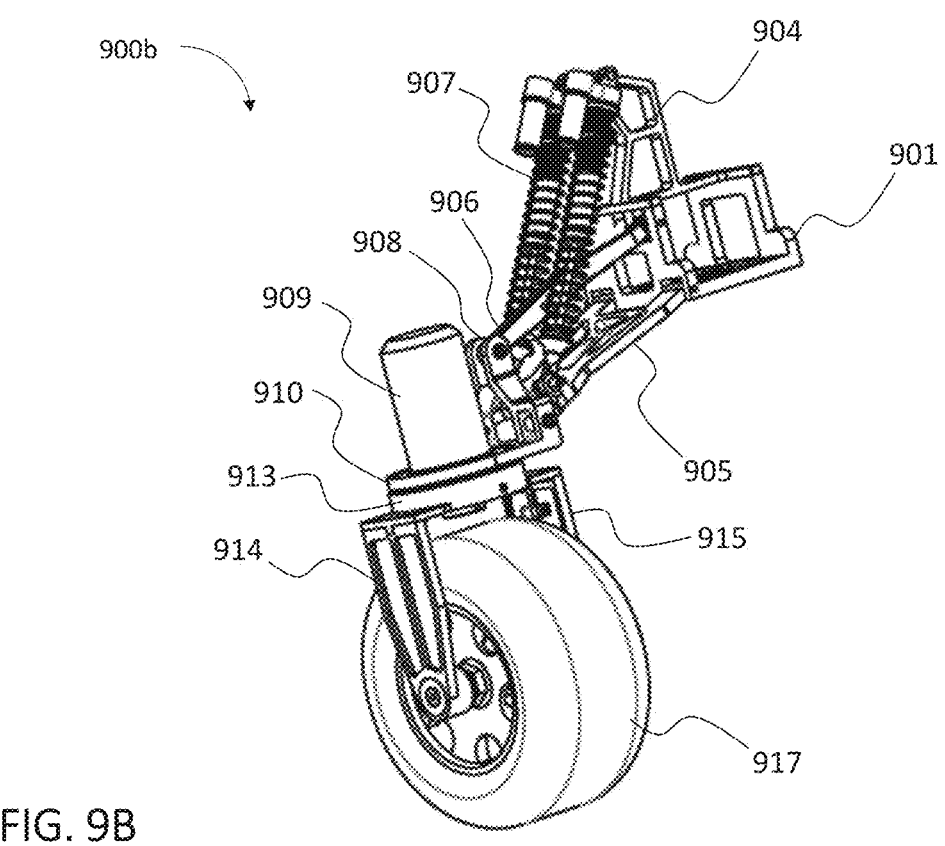

Another example of a wheel with a connector is demonstrated in FIGS. 9A and 9B. The wheel holder in FIGS. 9A and 9B are slightly different from that of FIGS. 8A and 8B in the way that the vertical arm is connected to the structure that holds the wheel. FIG. 9A shows a connector base 901, a suspension rack 904, a bottom arm 905, a top arm 906, one or more suspension arms 907, a vertical arm 908, and a rotation motor 909, which are similar to the connector base 801, suspension rack 804, bottom arm 805, top arm 806, suspension arms 807, vertical arm 808, and rotation motor 809 as discussed in FIG. 8A. The bottom of the vertical arm 908 is connected to the side of a collar 910, through which the rotation motor 909 is inserted and the axle of the rotation motor 909 is connected to the top center of a wheel holder 913. The rotation motor 909 can drive the wheel holder 913 to rotate with respect to the collar 910 for 360 degrees about the axle of the rotation motor 909. In an embodiment, the rotation motor 909 can drive the wheel holder 913 to rotate with respect to the collar 910 for more or less than 360 degrees about the axle of the rotation motor 909.

The wheel holder 913 includes a main arm 914, an auxiliary arm 915, and a speed motor 916, which are similar to the main arm 814, auxiliary arm 815, and speed motor 816 of FIG. 8A. A wheel 917 is located between main arm 914 and auxiliary arm 915, and is mounted on the axle of the speed motor 916 to rotate about the axle of the speed motor 916. The wheel 917 may have a tire mounted on the outer edge of the wheel 917. The rotation motor 909 and the speed motor 916 may be individually controlled. FIG. 9B illustrates a perspective view 900b with two suspension arms 907 visible and a side view of the support arm 914.

Figure 9C:
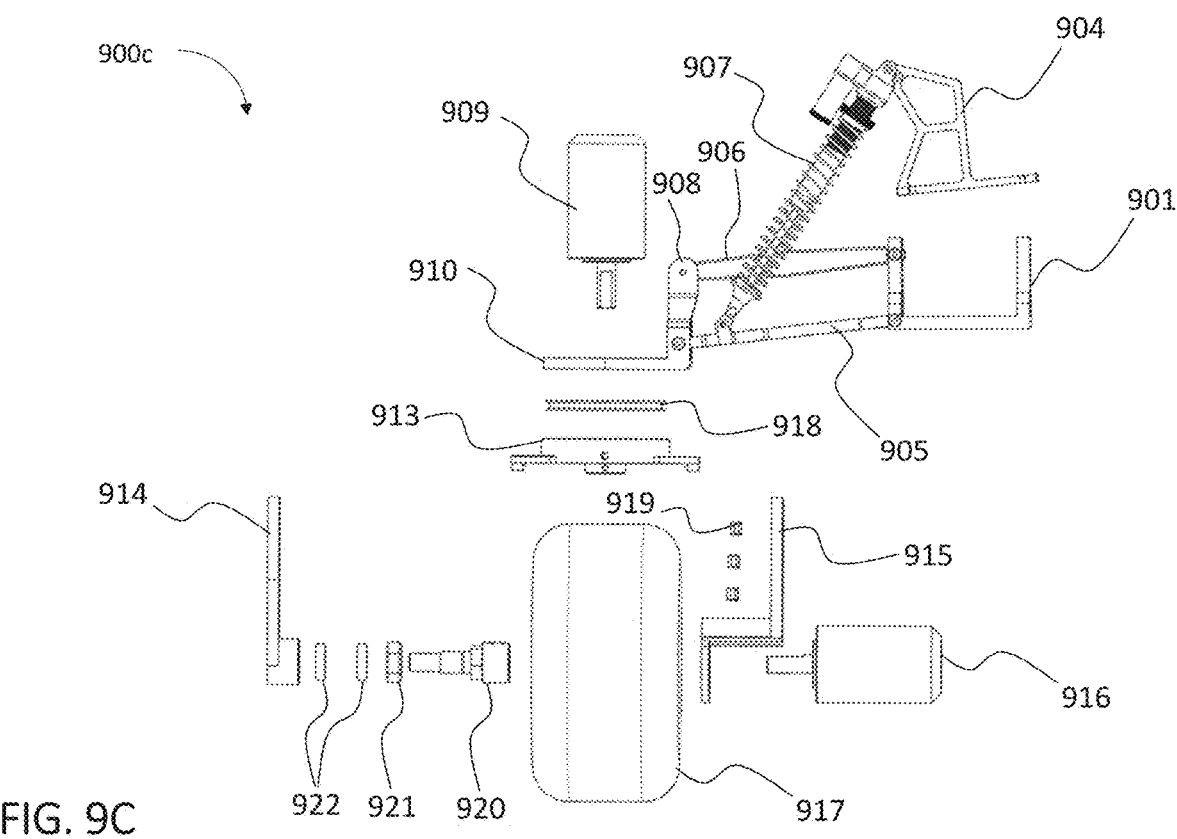

FIG. 9C shows an exploded view 900c of the system 900a. The suspension rack 904 may be detachable from the connector base 901. A bearing 918 is fitted within the collar 910 to reduce the friction when the wheel holder 913 rotates with respect to the collar 910. Non-limiting examples of the bearing 918 may include a roller bearing and a needle bearing. A plurality of clamping devices 919 are installed on the motor arm 915, optionally on one side facing the wheel 917. The clamping devices 919 serve to fix electric wires that connect the speed motor 916 to the control terminal and power source, for providing electrical power and control signals to the speed motor 916. The wheel 917 is mounted on an axle 920 that is coaxially connected with the axel of the speed motor 916. A nut 921 and bearings 922 are mounted on one end of the axle 920 for supporting the axle 920.

Figure 9D:
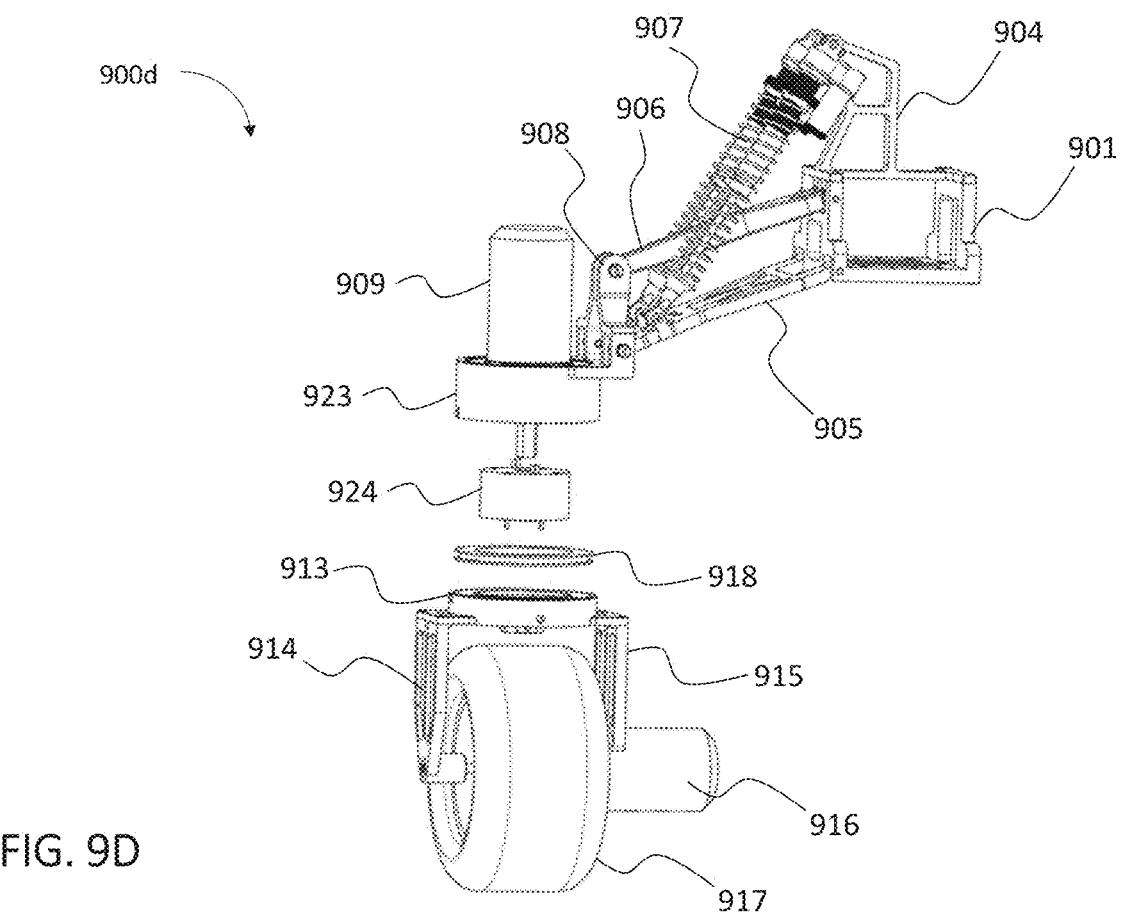
Figure 9E:
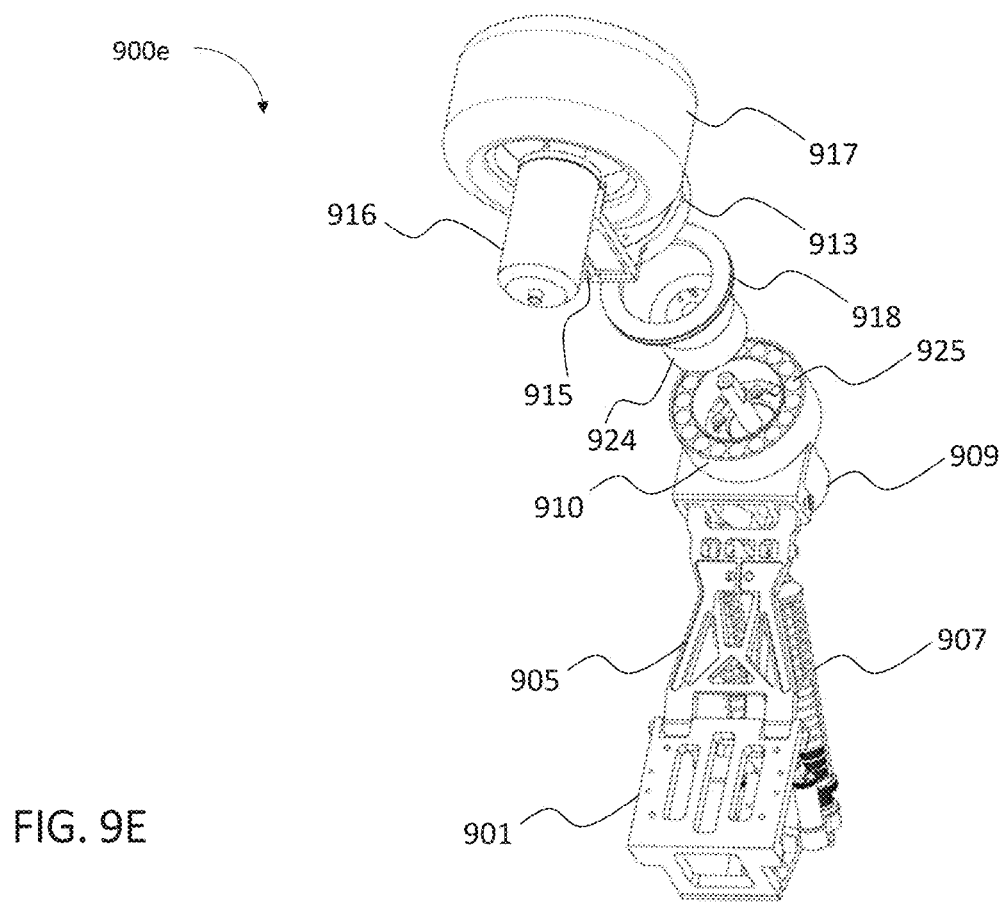

FIGS. 9D and 9E illustrate different views of a partially assembled wheel holder. FIG. 9D shows that a collar 923, which may be similar to the collar 810 of FIG. 8A, is fixed to the vertical arm 908 for holding the rotation motor 909. A slip ring 924 is fitted within the collar 923 and has conductors that are in contact with conductive components in the wheel holder 913. The slip ring 924 allows the transmission of electric power and signals from the control terminal through the wheel holder 913 to the speed motor 916, even during rotation of the wheel holder 913. FIG. 9E shows a view 900e from the bottom side of the partially assembled wheel holder. Alternatively, other types of rotating electrical connectors may be used to facilitate transmission of electric power and signals from the collar 923 to the wheel holder 913. The side of the collar 910 facing the wheel 917 includes a plurality of ball bearings 925 that facilitate rotation of the wheel holder 913 and reduce friction.

Figure 10:
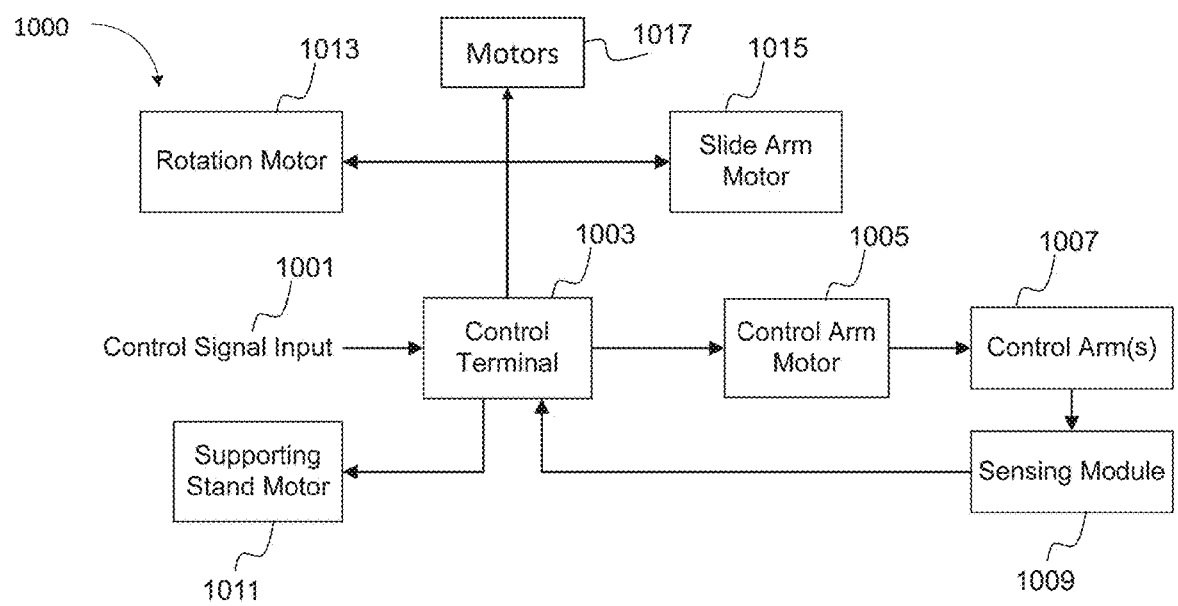
FIG. 10 is a scenario for controlling the system to provide stability support.

FIG. 10 illustrates an example system 1000 for controlling an apparatus to provide stability support. Control signal input 1001 is received at a control terminal 1003, which processes the control signal input 1001. The control terminal 1003 can also receive data indicating the status of the apparatus (such as tilting angles, speeds, and/or orientations of various components of the apparatus). In some embodiments, the control terminal 1003 of the apparatus as disclosed herein include a proportional-integral-derivative controller (PID controller). A sensing module 1009 detects the status of the apparatus and feeds back to the control terminal 1003. It should be understood that the sensing module 1009 can not only detect the status of the control arms 1007, but also receive sensing data from sensors coupled to any other components of the apparatus (e.g., wheels, leveling platform, supporting stand, slide arms, guide rail, payload/camera, etc.). In one instance, the sensing module 1009 includes an inertial measurement unit (IMU) and/or other types of sensors. Based on the control signal input 1001 and the current status of the apparatus, the control terminal 1003 calculates parameters to adjust the components of the apparatus. For example, the control terminal 1003 can send instructions to a base rotation motor 1013 that effects the rotation of the base, so as to keep the plane of the pivoting of the leveling platform parallel to the direction of movement. The control terminal 1003 may also send instructions to a control arm motor 1005 to adjust the length of the control arm(s) 1007. The control terminal 1003 may also send instructions to a supporting stand motor 1011 that effects the adjustment of the length of the supporting stand, a slide arm motor 1015 that effects the sliding of the slide arm on the guide rail, and/or a rotation motor that effects the rotation of the guide rail. In one embodiment, the control terminal 1003 can optionally send instructions to control the motors 1017 that adjust the orientation and speed of each wheel.

Figure 11A:
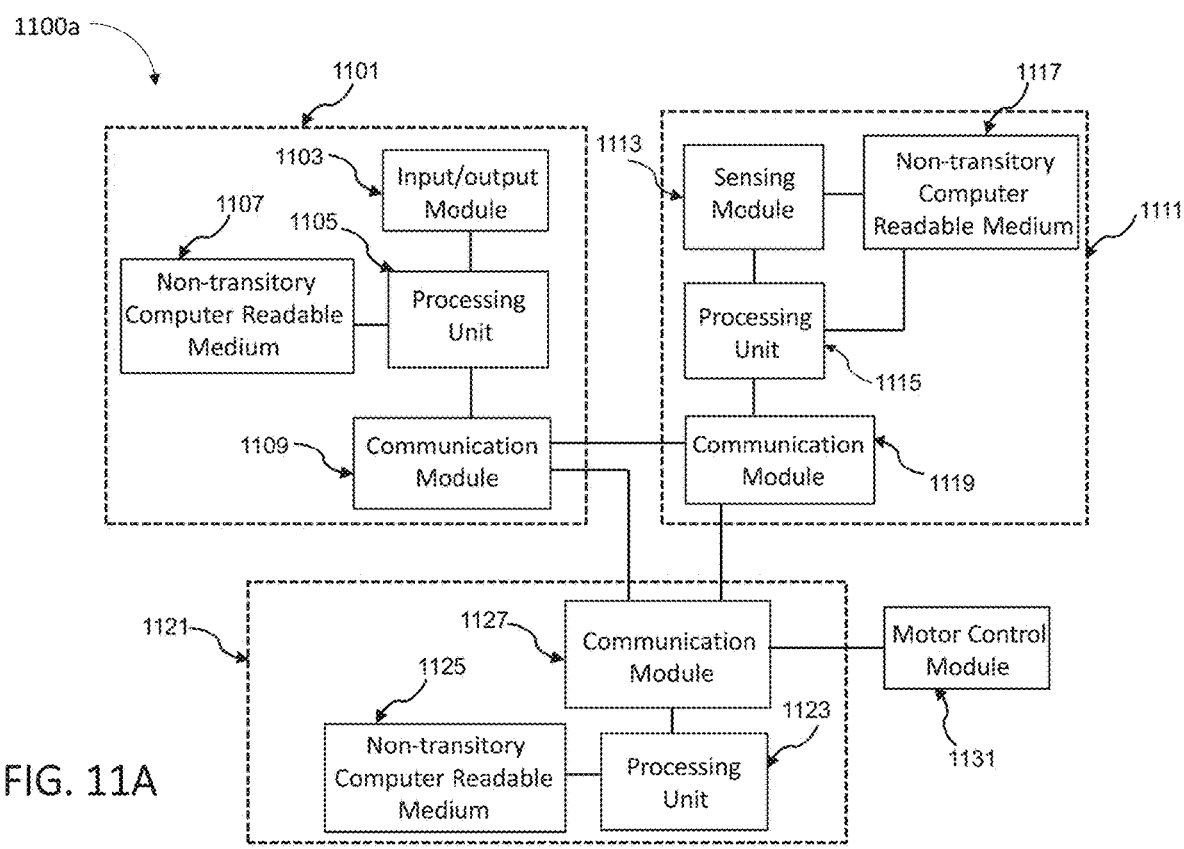
FIG. 11A is a schematic illustration by way of block diagram of a system for providing stability support.

FIG. 11A is a schematic illustration by way of block diagram of a system 1100*a* for providing stability support. The system 1100*a* can be used in combination with any suitable embodiment of the systems, apparatuses, and methods disclosed herein. The system 1100*a* includes a user terminal 1101 that may include an input/output module 1103, a processing unit 1105, a non-transitory computer readable medium 1107, and a communication module 1109. The system 1100*a* also includes a sensing device 1111 that can include a sensing module 1113, a processing unit 1115, a non-transitory computer readable medium 1117, and a communication module 1119. The user terminal 1101 and sensing device 1111 may be electronically or wirelessly connected to a control terminal 1121 that can include a processing unit 1123, a non-transitory computer readable medium 1125, and a communication module 1127. The control terminal 1121 may be electronically or wirelessly connected to motor control module 1131 to control the corresponding motors so as to adjust the status of the apparatus.

The user terminal 1101 may be a remote controller or a user device on which a GUI is installed. The user terminal 1101 can include an input/output module 1103 that includes hardware and software allowing the user to interact with the user terminal 1101. The input/output module 1103 can receive user input data for controlling the system. In an embodiment, the input/output module 1103 may display the input data and/or the status of the apparatus. Alternatively or additionally the input/output module 1103 may display real-time payload data (e.g., images/videos) acquired by a payload (e.g., a camera) mounted on the apparatus.

The user terminal 1101 includes a processing unit 1105 that can have one or more processors, such as a programmable processor (e.g., a central processing unit (CPU)). The processing unit 1105 can be operatively coupled to a non-transitory computer readable medium 1107. The non-transitory computer readable medium 1107 can store logic, code, and/or program instructions executable by the processing unit 1105 for performing one or more steps. The non-transitory computer readable medium 1107 can include one or more memory units (e.g., removable media or external storage such as an SD card or random access memory (RAM)). In some embodiments, input data from the user via the input/output module 1103 or from a remote device (e.g., a sensing device or other external devices) can be stored within the memory units of the non-transitory computer readable medium 1107. The memory units of the non-transitory computer readable medium 1107 can store logic, code and/or program instructions executable by the processing unit 1105 to perform any suitable embodiment of the methods described herein. For example, the processing unit 1105 can be configured to execute instructions causing one or more processors of the processing unit 1105 to process input data and sensing data, and/or calculate desired orientation and speed of the apparatus. The memory units can store input data and/or calculation algorithms to be processed by the processing unit 1105. In some embodiments, the memory units of the non-transitory computer readable medium 1107 can be used to store the processing results produced by the processing unit 1105.

The processing unit 1105 can be operatively coupled to a communication module 1109 configured to transmit and/or receive data from one or more external devices (e.g., the control terminal, the sensing device, a remote controller, or other external devices). Any suitable means of communication can be used, such as wired communication or wireless communication. For example, the communication module 1109 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1109 can transmit and/or receive one or more of user input, sensing data from the sensing device, processing results produced by the processing unit 1105, predetermined control data, and the like.

The components of the user terminal 1101 can be arranged in any suitable configuration. For example, one or more of the components of the user terminal 1101 can be located on external devices (e.g., a remote controller, or an external display device) in communication with one or more of the above. The system 1100*a* may include one or more user terminals that each includes one or more of the components of the user terminal 1101 as shown in FIG. 11A, and/or other components. Additionally, although FIG. 11A depicts a single processing unit 1105 and a single non-transitory computer readable medium 1107, one of skill in the art would appreciate that this is not intended to be limiting, and that the user terminal 1101 can include a plurality of processing units and/or non-transitory computer readable media. In some embodiments, one or more of the plurality of processing units and/or non-transitory computer readable media can be situated at different locations, such as on a remote controller, external terminal, display module, additional external device in communication with one or more of the above, or suitable combinations thereof, such that any suitable aspect of the processing and/or memory functions performed by the system can occur at one or more of the aforementioned locations.

The sensing device 1111 includes a sensing module 1113 that can utilize one or more sensors to collect information relating to the status of the apparatus. Different types of sensing devices may include different types of sensors that may sense different types of signals or signals from different sources. For example, an inertial measurement unit (IMU) that includes accelerometers and gyroscopes may be used for detecting changes in position, orientation, angles, and speeds of one or more components of the system. In yet another example, hall sensors can detect the orientation of the wheels. In another example, distance sensors, tilting sensors, and position sensors can also be used to detect movements of various components of the apparatus. The sensing module 1113 can be operatively coupled to a processing unit 1115 having a plurality of processors. In some embodiments, the sensing device 1111 may have sensing modules 1113 that may be attached to any components of the system. For example, the sensing modules 1113 may be attached to the movable foundation (e.g., 101) of a vehicle, on the leveling platform (e.g., 106, 403, 605), supporting stand (e.g., 110), rotation base (e.g., 112), guide rail (e.g., 111), sliding arm (113), control arms (e.g., 108, 404, 606), wheel holders (e.g., 813, 913), wheels (e.g., 102, 502).

The processing unit 1115 can have one or more processors, such as a programmable processor (e.g., a central processing unit (CPU)). The processing unit 1115 can be operatively coupled to a non-transitory computer readable medium 1117. The non-transitory computer readable medium 1117 can store logic, code, and/or program instructions executable by the processing unit 1115 for performing one or more steps. The non-transitory computer readable medium 1117 can include one or more memory units (e.g., removable media or external storage such as an SD card or random access memory (RAM)). In some embodiments, data from the sensing module 1113 can be directly conveyed to and stored within the memory units of the non-transitory computer readable medium 1117. The memory units of the non-transitory computer readable medium 1117 can store logic, code and/or program instructions executable by the processing unit 1115 to perform any suitable embodiment of the methods described herein. For example, the processing unit 1115 can be configured to execute instructions causing one or more processors of the processing unit 1115 to analyze sensing data from the sensing module 1113 and to calculate parameters to adjust the apparatus, based on the sensing data. For instance, the processing unit 1115 can be configured to calculate parameters for adjust the length of the control arms (e.g., control arm 108 of FIG. 1, control arms 404 of FIG. 4, or control arms 606 of FIG. 6A). The memory units can store sensing data from the sensing module 1113 to be processed by the processing unit 1115. In some embodiments, the memory units of the non-transitory computer readable medium 1117 can be used to store the processing results produced by the processing unit 1115.

The processing unit 1115 can be operatively coupled to a communication module 1119 configured to transmit and/or receive data from one or more external devices (e.g., the user terminal 1101, or the control terminal). Any suitable means of communication can be used, such as wired communication or wireless communication. The communication module 1119 can transmit and/or receive one or more of the sensing data from the sensing module 1113, processing results produced by the processing unit 1115, predetermined control data, user input data from the user terminal 1101, and the like.

The components of the sensing device 1111 can be arranged in any suitable configuration. For example, one or more of the components of the sensing device 1111 can be located on different components/locations of the apparatus, in communication with one or more of the above. The system 1100a may include one or more sensing devices that each includes one or more of the components of the sensing device 1111 as shown in FIG. 11A, and/or other components. Additionally, although FIG. 11A depicts a single processing unit 1115 and a single non-transitory computer readable medium 1117, one of skill in the art would appreciate that this is not intended to be limiting, and that the sensing device 1111 can include a plurality of processing units and/or non-transitory computer readable media. In some embodiments, one or more of the plurality of processing units and/or non-transitory computer readable media can be situated at different locations in communication with one or more of the above, or suitable combinations thereof, such that any suitable aspect of the processing and/or memory functions performed by the system can occur at one or more of the aforementioned locations.

The control terminal 1121 includes a processing unit 1123 that can have one or more processors, such as a programmable processor (e.g., a central processing unit (CPU)). In one embodiment, the control terminal 1121 is similar to the control terminal 1003 of FIG. 10. In some embodiment, the control terminal 1121 may be installed inside, on top of, beneath, or at one side of the movable foundation of the vehicle, or may be located anywhere on the vehicle. In some embodiments, the control terminal 1121 and the sensing device 1111 may be located on the same vehicle. In alternative embodiments, the control terminal 1121 and the sensing device 1111 may be implemented by different devices/systems. For example, the control terminal 1121 may be installed on the movable foundation of the vehicle, while the sensing device 1111 may be installed on a camera.

The processing unit 1123 can be operatively coupled to a non-transitory computer readable medium 1125. The non-transitory computer readable medium 1125 can store logic, code, and/or program instructions executable by the processing unit 1123 for performing one or more steps. The non-transitory computer readable medium 1125 can include one or more memory units (e.g., removable media or external storage such as an SD card or random access memory (RAM)). In some embodiments, data received from the sensing device 1111 and/or user terminal 1101 can be stored within the memory units of the non-transitory computer readable medium 1125. The memory units of the non-transitory computer readable medium 1125 can store logic, code and/or program instructions executable by the processing unit 1123 to perform any suitable embodiment of the methods described herein. For example, the processing unit 1123 can be configured to execute instructions causing one or more processors of the processing unit 1123 to analyze data received from the user terminal 1101 and/or the sensing device 1111, calculate and determine desired orientation and/or speed, and/or generate control instructions to control the motors. In some embodiments, the memory units of the non-transitory computer readable medium 1125 can be used to store the processing results produced by the processing unit 1123.

The processing unit 1123 can be operatively coupled to a communication module 1127 configured to transmit and/or receive data from one or more external devices (e.g., the user terminal 1101, the sensing device 1111, a remote controller, or other external devices). Any suitable means of communication can be used, such as wired communication or wireless communication. The communication module 1127 can receive and/or transmit one or more of input from the user terminal 1101, sensing data from the sensing device 1111, processing results produced by the processing unit 1123, user commands from the user terminal 1101, and the like.

The components of the control terminal 1121 can be arranged in any suitable configuration. For example, one or more of the components of the control terminal 1121 can be located on different components/locations of the apparatus, in communication with one or more of the above. The system 1100a may include one or more control terminals that each includes one or more of the components of the control terminal 1121 as shown in FIG. 11A, and/or other components. Additionally, although FIG. 11A depicts a single processing unit 1123 and a single non-transitory computer readable medium 1125, one of skill in the art would appreciate that this is not intended to be limiting, and that the control terminal 1121 can include a plurality of processing units and/or non-transitory computer readable media. In some embodiments, one or more of the plurality of processing units and/or non-transitory computer readable media can be situated at different locations in communication with one or more of the above, or suitable combinations thereof, such that any suitable aspect of the processing and/or memory functions performed by the server can occur at one or more of the aforementioned locations.

Motor control module 1131 may include a plurality of motor drivers that each drives a motor for adjusting the status of a component in the system. In some embodiments, the motor control modules 1131 may include an electronic speed control (ESC) and/or other components. For example, the motor control module 1131 may control motor drivers for the rotation motor and speed motor for each wheel. In another example, the motor control module 1131 may control motor drivers for motors that effect rotation of the base and/or guide rail, adjustment of the length of the arm(s), and movement of the sliding arm. The motor control module 1131 may be electronically or wirelessly connected to the control terminal 1121. In one embodiment, each wheel of the system includes two motors (e.g., the rotation motor and speed motor) that are driven by two individual motor drivers. The motor drivers may receive control instructions from the control terminal 1121 to control the operation of the corresponding motor. In an embodiment, the motor control module 1131 may include a processing unit that is operatively coupled to a non-transitory computer readable media. The non-transitory computer readable medium can store logic, code, and/or program instructions executable by the processing unit for performing one or more steps, such as analyzing data or instructions received from the control terminal 1121 and/or sensing device 1111, calculating and determining parameters to adjusting operations of motors. In some embodiment, the motor control module 1131 and the control module 1121 may be installed on the same vehicle.

Figure 11B:
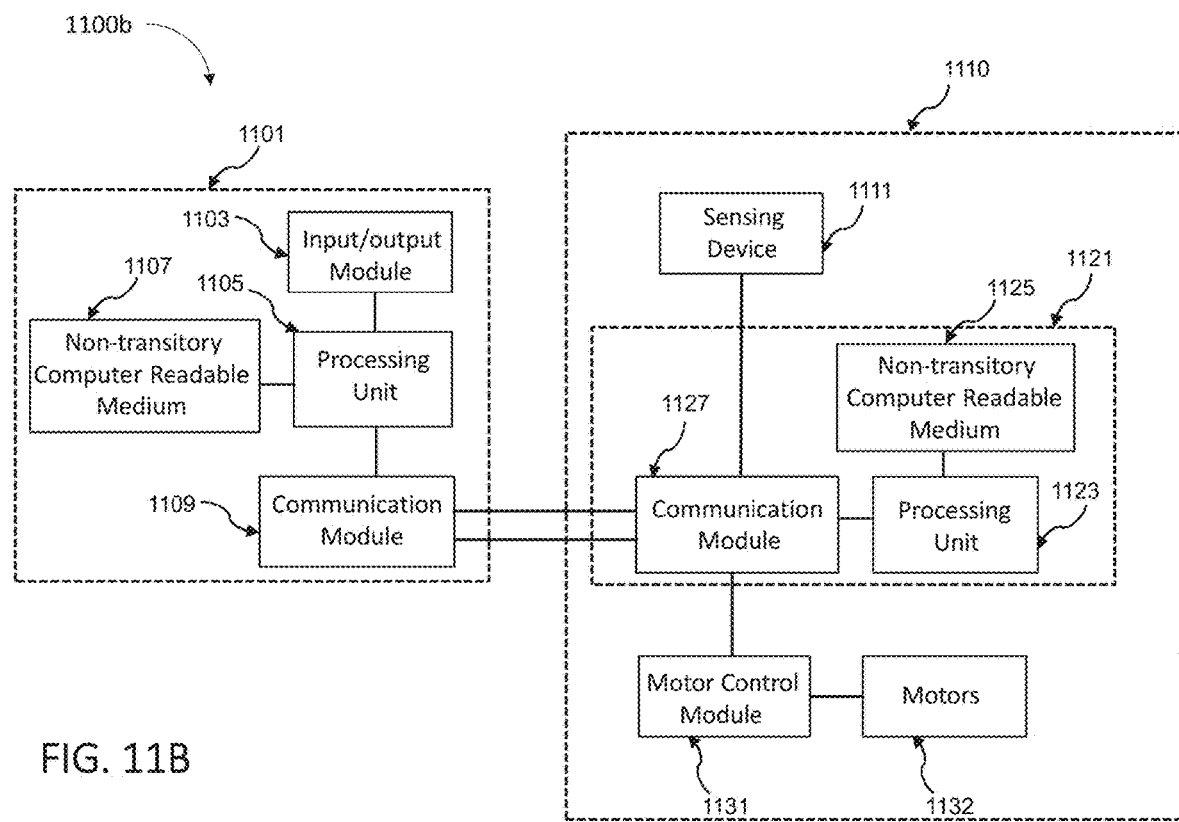
FIG. 11B is a schematic illustration by way of block diagram of a system for controlling a vehicle.

FIG. 11B is another illustration showing a system 111b that controls a vehicle 1110, which may be a vehicle as disclosed in any of the embodiments. In some embodiments, the vehicle 1110 may include the control terminal 1121, the sensing device 1111, and the motor control module 1131 that controls the motors 1132. The user terminal 1110 may be in communication with the control terminal 1121 of the vehicle 1110 to transmit user command. The control terminal 1121 of the vehicle 1110 may receive sensing data from the sensing device 1111 of the vehicle 1110, and based on the user command and the sensing data, send control signal to the motor control module 1131 to control motors 1132. The motors may include any motor as disclosed herein.

Figure 12:
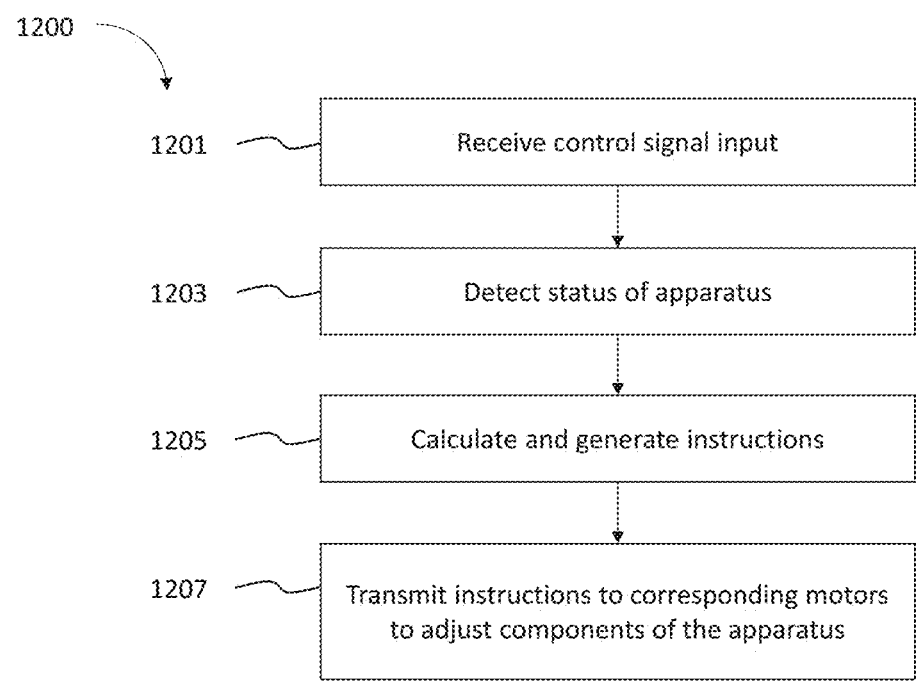
FIG. 12 is a flow chart of controlling the system to provide stability support, in accordance with an embodiment of the disclosure.

FIG. 12 is a flow chart illustrating a method 1200 of providing stability support, in accordance with an embodiment of the disclosure. At step 1201, a user may input control commands via the input/output module 1103 of the user terminal 1101, for example, and the apparatus receives control signal from the user terminal 1101. At step 1203, status of the apparatus is detected, via the sensing module 1113 of the sensing device 1111, and transmitted to the control terminal 1121. At step 1205, the processing unit 1123 of the control terminal 1121 calculates and determines parameters for controlling the motors (e.g., via motor control module 1131) and generates control instructions accordingly. At step 1207, the control terminal 1121 transmits the generated instructions to the motor control module 1131 to effect the adjustment of corresponding components (e.g., the motors as disclosed in the embodiments herein) of the system.

Figure 13:
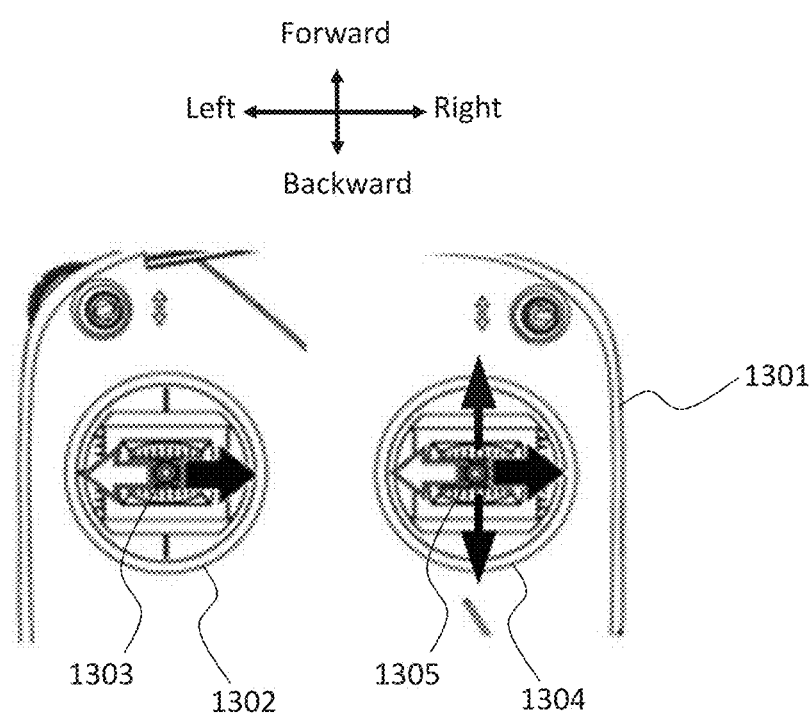
FIG. 13 illustrates a remote controller.

FIG. 13 illustrates a remote controller 1301 according to embodiments of the disclosure. The remote controller 1301 may be wirelessly connected to a control terminal (e.g., the control terminal 1003 or 1121) or motor drivers or control module (e.g., the motor control module 1131) that control the corresponding motors to adjust the status of the apparatus. In some instances, the remote controller 1301 controls the movement of the vehicle (e.g., the vehicle in the embodiments as disclosed herein) in linear directions as well as to make turns. The remote controller 1301 may be held in front of a user (e.g., using one or two hands). The following discussion refer to forward-backward directions and left-right directions with reference to the remote controller 1301. In some embodiments, the forward-backward and left-right directions with respect to the remote controller 1301 correspond to forward-backward and left-right directions of movement of the vehicle.

The remote controller 1301 may include an angular control module 1302 for controlling angular movement of the vehicle, and a linear control module 1304 for controlling linear movements of the vehicle. The angular control module 1302 includes a turning handle 1303 that is configured to move in left-right directions for controlling the vehicle to turn left or right. In one embodiment, moving the turning handle 1303 to the left generates a left turn input, while moving the turning handle 1303 to the right generates a right turn input. The turning handle 1303 is connected to corresponding hardware that includes a sensor. The sensor is configured to measure displacement of the turning handle 1303 to the left or right and to transmit sensing signals indicating the corresponding user input. The displacement of the turning handle 1303 may be used to determine the radius of the turning circle. For example, the larger the displacement of the turning handle 1303, the smaller the radius of the turning circle and the sharper the turn.

The linear control module 1304 includes a linear control handle 1305 that is configured to move in forward-backward and left-right directions for controlling the vehicle to travel forward, backward, to the left, or to the right. In one embodiment, the linear control handle 1305 can be pushed to any direction to control the vehicle to travel in any direction on an uneven surface. For example, the linear control handle 1305 can be pushed in a left-forward direction, a left-backward direction, a right-forward direction, or a right-backward direction. The linear control handle 1305 is connected to corresponding hardware that includes at least one sensor. The sensor is configured to measure direction and displacement of the linear control handle 1305 and to transmit sensing signals indicating the corresponding user input. The direction of the linear control handle 1305 may correspond to the direction of the movement of the vehicle. The displacement of the linear control handle 1305 may be used to determine the speed of the vehicle in the corresponding direction. For example, the larger the displacement of the linear control handle 1305, the faster the vehicle travels in the corresponding direction.

In an alternative embodiment, the remote controller 1301 may include a touchscreen and a GUI for receiving user input, instead of physical handles. The GUI may be configured to detect finger movements and accordingly determine the user instructions to control the vehicle to move and/or to turn.

Figure 14A:
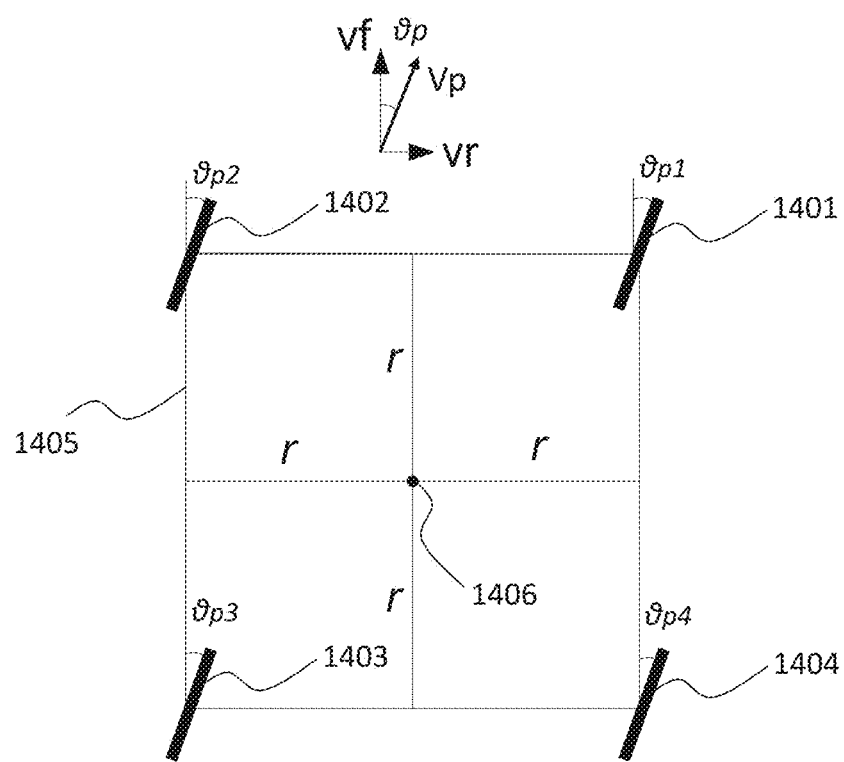
FIG. 14A illustrate calculation of speed and orientation of each wheel in linear directions based on user input.

FIG. 14A illustrates calculation of the orientations and speeds of the wheels 1401-1404 based on user input data via the linear control handle 1305. In one aspect, the speed of the foundation $v_p$ is proportional to the displacement of the linear control handle 1305. The speed $v_f$ is calculated based on the displacement of the linear control handle 1305 in the forward-backward direction. The speed $v_r$ is calculated based on the displacement of the linear control handle 1305 in the left-right direction. The direction of movement (e.g., indicated by the angle $\theta_p$ from the forward direction) is calculated based on the direction of the linear control handle 1305. The distance between the center 1406 of the foundation and the side of the foundation is r, which is half of the width of the foundation. Based on user input, the speed and orientation of each wheel can be determined using the following formulas.

In linear movements, the speeds of the wheels ($v_{p1}$, $v_{p2}$, $v_{p3}$, $v_{p4}$) are the same as the speed of the foundation $v_p$ (e.g., $v_{p1}=v_{p2}=v_{p3}=v_{p4}=v_p$). The orientations of the wheels ($\theta_{p1}$, $\theta_{p2}$, $\theta_{p3}$, $\theta_{p4}$) align with the direction of movement of the foundation (e.g., $\theta_{p1}=\theta_{p2}=\theta_{p3}=\theta_{p4}=\theta_p$). The speed $v_p$ can be calculated as $v_p=\sqrt{v_f^2+v_r^2}$, while the angle $\theta_p$ can be calculated as $$\theta_p = \arcsin\frac{v_r}{\sqrt{v_f^2+v_r^2}}.$$

Figure 14B:
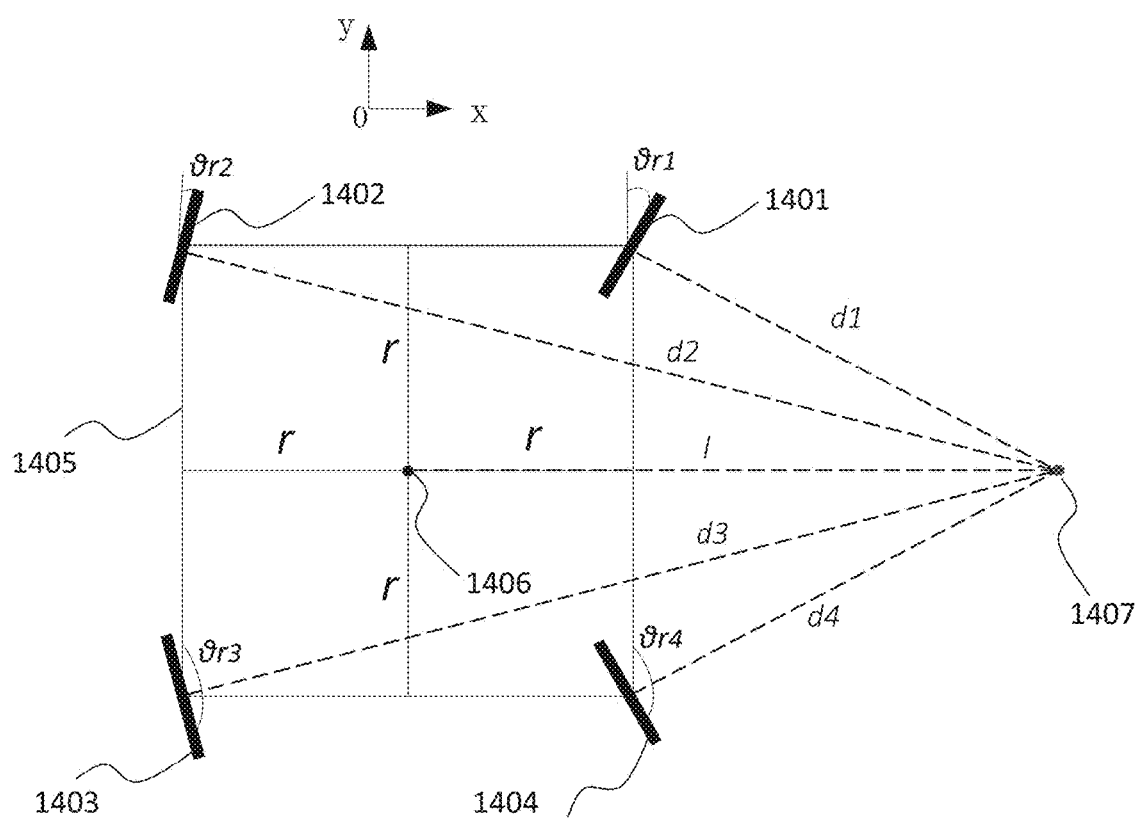
FIG. 14B illustrates calculation of speed and orientation of each wheel when making a turn based on user input.

FIG. 14B illustrates calculation of the orientations and speeds of the wheels 1401-1404 based on input data via the turning handle 1303. An xy-coordinate system is indicated using the center 1406 of the foundation as the origin, the forward moving direction as the y-axis, and the right direction of movement as x-axis. The radius l of a turn is the distance between the center 1406 of the foundation and the center 1407 of the turning circle. In one aspect, the radius l is determined based on the displacement of the turning handle 1303. For example, the radius l is inversely proportional to the displacement of the turning handle 1303. The radiuses ($d_1$, $d_2$, $d_3$, $d_4$) of the turns of the wheels are the distances of the center of wheels to the center 1407 of the turning circle.

To make a smooth turn, each wheel is orientated perpendicular to the radius of the turn of the corresponding wheel. In one embodiment, the wheels 1401 and 1404 have the same distance from the center 1407, and the wheels 1402 and 1403 have the same distance, as shown in FIG. 14B. Since the wheels 1401 and 1404 and the wheels 1402 and 1403 are at different distance from the center 1407 of the turning circle, the speeds of the wheels 1401 and 1404 may be different from the wheels 1402 and 1403 when making a turn. In an example, the wheels are located in four corners of a square foundation/base and a distance of the center to each side of the foundation is r. When the radius l of the turn is larger than r, the angle ($\theta_{r1}$, $\theta_{r2}$, $\theta_{r3}$, $\theta_{r4}$) of each wheel from the y-axis and the speeds ($v_1$, $v_2$, $v_3$, $v_4$) can be calculated using the following formulas.

$$\theta_{r1} = \arcsin\left(\frac{r}{d_1}\right) = \arcsin\left(\frac{r}{\sqrt{(l-r)^2+r^2}}\right); v_1 = v_p$$

$$\theta_{r2} = \arcsin\left(\frac{r}{d_2}\right) = \arcsin\left(\frac{r}{\sqrt{(l+r)^2+r^2}}\right); v_2 = \frac{d_2}{d_1}v_1$$

$$\theta_{r3} = \pi - \theta_{r2}; v_3 = \frac{d_3}{d_1}v_1$$

$$\theta_{r4} = \pi - \theta_{r1}; v_4 = \frac{d_4}{d_1}v_1$$

According to the calculated data based on input from both the linear control handle 1305 and turning handle 1303, the desired angles ($\theta_1$, $\theta_2$, $\theta_3$, $\theta_4$) and speeds ($v_1$, $v_2$, $v_3$, $v_4$) of the wheels can be calculated using the following formulas.

$$\theta_1 = \theta_{p1} + \theta_{r1}; v_1 = v_p$$

$$\theta_2 = \theta_{p2} + \theta_{r2}; v_2 = \frac{d_2}{d_1}v_p$$

$$\theta_3 = \theta_{p3} + \theta_{r3}; v_3 = \frac{d_3}{d_1}v_p$$

$$\theta_4 = \theta_{p4} + \theta_{r4}; v_4 = \frac{d_4}{d_1}v_p$$

In another example, the movable foundation may have other shapes (e.g., a rectangular shape, a circular shape, an oval shape, etc.), and the wheels may not locate at the corners of the base. The angle and speed data of each wheel can be calculated accordingly.

The calculated angle and speed data of each wheel can then be transmitted to corresponding motor drivers. The rotation motor can be driven to rotate the corresponding wheel holder to adopt the calculated orientation, while the speed motor can be driven to adopt the calculated speed for the corresponding wheel.

Figure 15:
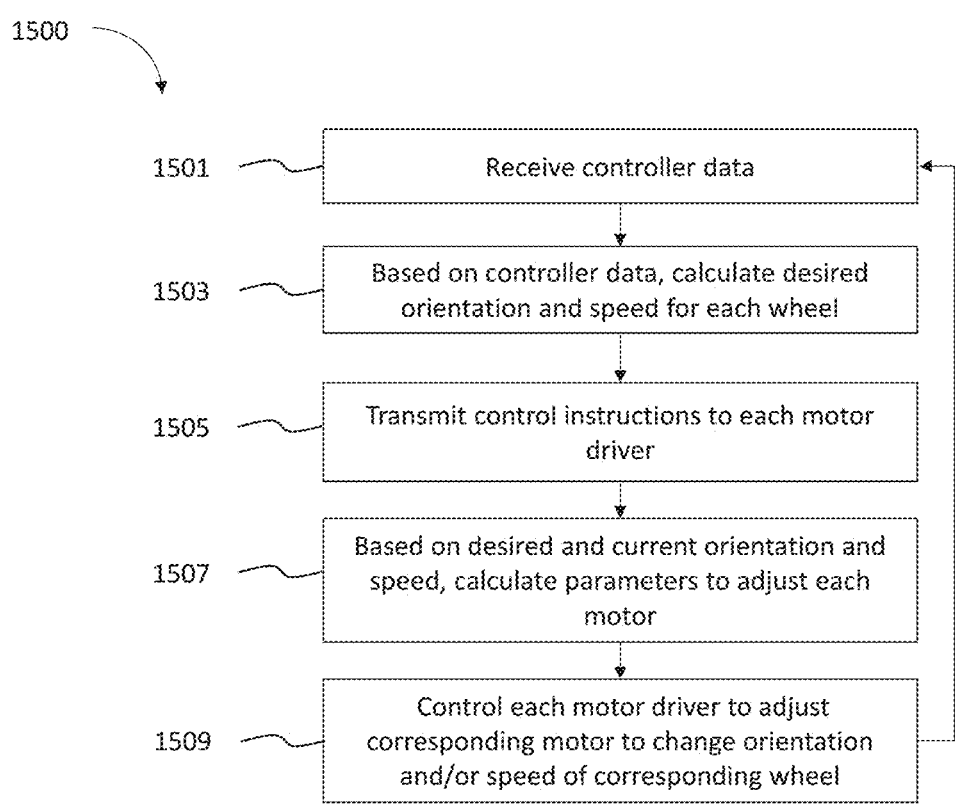
FIG. 15 is a flow chart of controlling the movement of the wheels, in accordance with an embodiment of the disclosure.

FIG. 15 is a flow chart of controlling the wheels based on user input, in accordance with an embodiment of the disclosure. At step 1501, the remote controller receives user input, for example, via the linear control handle 1305 and/or turning handle 1303. At step 1503, speed and orientation of each wheel is calculated based on, for example, directions and displacements of the linear control handle 1305 and turning handle 1303. In one embodiment, the desired speed and orientation of each wheel are determined using the formulas as discussed above in FIGS. 14A-B. Step 1503 may be carried out by the remote controller or the control terminal. At step 1505, the remote controller or the control terminal transmit the calculated data and/or control instructions to each motor driver associated with the wheels. At step 1507, the motor drivers or the control terminal receives, from the sensing device(s), detection data about the current speeds and orientations of the wheels. As part of the step 1507, the motor drivers or the control terminal calculates parameters to adjust each motor. At step 1509, based on the parameters determined at step 1507, each motor driver controls the corresponding motor to adjust orientation and/or speed of the corresponding wheel.

A few example embodiments are described below. In one embodiment, provided is an apparatus that comprises a movable foundation configured to move on a surface, a base rotatably mounted to the movable foundation, a base motor configured to effect the rotation of the base, and a leveling platform adjustably mounted to the base. The mounting allows the leveling platform to pivot around a pivoting axis intersecting the base. The apparatus further comprises a control arm that connects the leveling platform and the base. The control arm is configured to effect the pivoting of the leveling platform by adjusting the length of the control arm.

The apparatus may further include a control arm motor that is configured to effect adjustment of the length of the control arm. The control arm motor can be a linear motor or any other types of motors. The control arm can be a telescopic cylinder.

The apparatus may further include at least one supporting arm that connects the leveling platform and the base. The at least one supporting arm comprises a suspension system. The at least one support arm and the control arm may be located on opposite sides with respect to the pivoting axis of the leveling platform.

The apparatus may further include a supporting stand mounted on the leveling platform, and a guide rail rotatably mounted to the supporting stand. The apparatus may further include a supporting stand motor configured to effect adjustment of the length of the supporting stand. The guide rail may be rotatable about a rotation axis parallel to the supporting stand. The apparatus may further include a sliding arm that is moveably connected to the guide rail. The sliding arm is configured to slide along the guide rail. The sliding arm may include a first arm configured for pitch rotation, and a second arm connected to the first arm and configured for yaw rotation. The rotation of the guide rail and/or the sliding of the sliding arm may be effected by motors.

The apparatus may include at least one sensor that is configured for detecting direction and tilting of the leveling platform. The leveling platform can be rotatably mounted to a rotation shaft, which allows the leveling platform to pivot around the rotation shaft. The rotation shaft may be connected to a fulcrum that is mounted on the base. In one embodiment, the movable foundation is installed with wheels. Alternatively, the movable foundation is mounted on a drone or any other vehicle. A remote controller may be used to receive user input and control the apparatus via wireless communication.

The apparatus may include a processor and program code that is executed by the processor. The processor may control the apparatus to rotate the base as needed such that the plane of the pivoting of the leveling platform is parallel to the direction of the movement of the movable foundation. The apparatus may also adjust the angle as needed such that the leveling platform keeps a substantially constant horizontal orientation when the surface is uneven.

In another example, provided is an apparatus that comprises a movable foundation, and a supporting scaffold that is adjustably connected to the movable foundation by at least three control arms. The at least three control arms are configured to change length such that an angle of the supporting scaffold from the movable foundation changes. The apparatus may also include a control arm motor configured to effect adjustment of the length of each control arm. The apparatus may further include a guide rail that is rotatably mounted to the supporting scaffold and rotatable about a rotation axis parallel to the supporting scaffold; and a sliding arm moveably connected to the guide rail. The sliding arm is configured to slide along the guide rail. The rotation and sliding may be effected by motors.

The apparatus may include a level sensor for detecting horizontal orientation of the movable foundation and/or a level sensor for detecting vertical orientation of the supporting scaffold. The apparatus may further include a processor and program code which, when executed by the processor, controls the apparatus. A level signal can be received from the level sensor, and the length of one or more of the control arms can be adjusted where needed. Thus the supporting scaffold substantially keeps a substantially constant vertical orientation when the horizontal orientation of the movable foundation changes. In one embodiment, the horizontal orientation of the movable foundation comprises at least one selected from the group consisting of: yaw angle, pitch angle, and roll angle. The vertical orientation of the supporting scaffold comprises at least tilting angle of the supporting scaffold.

The apparatus may further include a guide rail rotatably mounted to the supporting scaffold and rotatable about a rotation axis parallel to the supporting scaffold; and a sliding arm moveably connected to the guide rail. The sliding arm is configured to slide along the guide rail. The program code, when executed by the processor, configures the apparatus to adjust a rotational angle of the guide rail and/or a distance of the sliding arm away from a center of the guide rail.

In another example, provided is a movable vehicle that comprises a foundation, at least three wheel holders each rotatably mounted to the foundation, a first motor configured to effect rotation of each wheel holder, a wheel rotatably connected to each of the wheel holders, and a second motor configured to effect rotation of each of the wheels. Each wheel holder is rotatable about a first axis, while each wheel is rotatable about a second axis that is different from the first axis. The first axis of each wheel holder may be parallel to each other. The second axis may be perpendicular to the first axis. Each wheel holder can rotate for 360 degrees about the first axis.

The movable vehicle may also include a sensor that is configured for detecting an orientation of each wheel relative to the foundation. The movable vehicle may further include a processor and program code which, when executed by the process, controls the movable vehicle. The movable vehicle, upon receiving an input to change movement direction of the movable vehicle, can calculate an orientation and a speed for each of the wheels. The processor then instructs each of the wheel holders to rotate such that the corresponding wheel adopts the calculated orientation, and instruct each of the wheels to rotate at the calculated speed. The processor may also control the vehicle to rotate each wheel to adopt an initial orientation based on detection data of the sensor, and calculate an angle from the initial orientation to rotate each wheel such that the corresponding wheel adopts the calculated orientation.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the present disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized electronic computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the present disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the present disclosure.

The foregoing description of the present disclosure has been provided for the purposes of illustration and description. It is not intended to be exhaustive or to limit the present disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the present disclosure and its practical application, thereby enabling others skilled in the art to understand the present disclosure for various embodiments and with various modifications that are suited to the particular use contemplated. It is intended that the scope of the present disclosure be defined by the following claims and their equivalence.

The invention claimed is:

1. An apparatus for providing stability support, the apparatus comprising:
   a base rotatably mounted to a movable foundation and rotatable around an axis perpendicular to a top surface of the movable foundation;
   a leveling platform pivotably mounted to the base and pivotable with respect to a pivoting axis that is parallel to the base; and
   a control arm connecting the leveling platform and the base and adjustable in length to effect pivoting of the leveling platform.

2. The apparatus of claim 1, further comprising:
   a control arm motor that effects adjustment of a length of the control arm.

3. The apparatus of claim 2, wherein the control arm motor is a linear motor.

4. The apparatus of claim 1, wherein the control arm is a telescopic cylinder.

5. The apparatus of claim 1, further comprising:
   at least one supporting arm connecting the leveling platform and the base, the at least one supporting arm comprising a suspension system, wherein the at least one support arm and the control arm are located on opposite sides with respect to the pivoting axis.

6. The apparatus of claim 1, further comprising:
   a supporting stand mounted on the leveling platform and having an adjustable length;
   a supporting stand motor that effects adjustment of a length of the supporting stand;
   a guide rail rotatably mounted to the supporting stand and rotatable about a rotation axis parallel to the supporting stand; and
   a sliding arm moveably connected to the guide rail and being slidable along the guide rail;
   a sliding arm motor that effects sliding of the sliding arm along the guide rail; and
   a first arm that provides pitch rotation, and a second arm connected to the first arm, wherein the second arm provides yaw rotation.

7. The apparatus of claim 1, further comprising:
   at least one sensor that detects an orientation of the leveling platform.

8. The apparatus of claim 1, wherein the movable foundation is installed with wheels and the movable foundation is mountable on an unmanned aerial vehicle (UAV).

9. The apparatus of claim 1, further comprising:
   a processor and program code which, when executed by the processor, control the apparatus to (a) rotate the base so as to substantially align a pivoting plane of the leveling platform with a direction of the movement of the movable foundation and (b) pivot the leveling platform with respect to the pivoting axis so as to substantially maintain a predetermined orientation.

10. The apparatus of claim 9, further comprising:
    a remote controller in wireless communication with the apparatus to receive user input to control the apparatus.

11. A system for providing stability support, the system comprising:
    an apparatus that comprises:
      a base rotatably mounted to a movable foundation and rotatable around an axis perpendicular to a top surface of the movable foundation;
      a leveling platform pivotably mounted to the base and pivotable with respect to a pivoting axis that is parallel with the base;
      a control arm connecting the leveling platform and the base and adjustable in length to effect pivoting of the leveling platform; and
    a processor and program code which, when executed by the processor, control the apparatus to (a) rotate the base so as to substantially align a pivoting plane of the leveling support with a direction of the movement of the movable foundation and (b) pivot the leveling platform with respect to the pivoting axis so as to substantially maintain a predetermined orientation.

* * * * *